United States Patent
Otsu et al.

(10) Patent No.: US 10,094,723 B2
(45) Date of Patent: Oct. 9, 2018

(54) SENSOR AND ELECTRONIC DEVICE

(71) Applicant: KABUSHIKI KAISHA TOSHIBA, Tokyo (JP)

(72) Inventors: Kenji Otsu, Kanagawa (JP); Michiko Hara, Kanagawa (JP); Yoshihiko Fuji, Kanagawa (JP); Kei Masunishi, Kanagawa (JP); Akiko Yuzawa, Kanagawa (JP); Tomohiko Nagata, Kanagawa (JP); Shiori Kaji, Kanagawa (JP); Yoshihiro Higashi, Ishikawa (JP); Kazuaki Okamoto, Kanagawa (JP); Shotaro Baba, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/440,484

(22) Filed: Feb. 23, 2017

(65) Prior Publication Data
US 2018/0080842 A1 Mar. 22, 2018

(30) Foreign Application Priority Data
Sep. 21, 2016 (JP) ................. 2016-184183

(51) Int. Cl.
*G01L 7/02* (2006.01)
*G01B 7/16* (2006.01)

(52) U.S. Cl.
CPC . *G01L 7/02* (2013.01); *G01B 7/18* (2013.01)

(58) Field of Classification Search
CPC ................ G01L 7/02; G01L 7/08; G01L 1/12
USPC .......................................... 73/774
See application file for complete search history.

(56) References Cited

U.S. PATENT DOCUMENTS

| 4,217,783 | A | 8/1980 | Ito et al. |
| 7,490,522 | B2* | 2/2009 | Ruehrig ............ G01L 1/12 |
| | | | 73/862.335 |
| 8,958,574 | B2* | 2/2015 | Fukuzawa .......... G01L 9/0042 |
| | | | 381/115 |
| 9,651,432 | B2* | 5/2017 | Fuji ..................... G01L 1/125 |

(Continued)

FOREIGN PATENT DOCUMENTS

| JP | 54-113379 | 9/1979 |
| JP | 09-281146 | 10/1997 |

(Continued)

*Primary Examiner* — Harshad R Patel
*Assistant Examiner* — Jamel Williams
(74) *Attorney, Agent, or Firm* — Finnegan, Henderson, Farabow, Garrett & Dunner, L.L.P.

(57) ABSTRACT

A sensor includes a film portion and a first sensor portion. The film portion is deformable. The first sensor portion is provided at the film portion. The first sensor portion includes a first conductive layer, a second conductive layer, a first magnetic layer, a second magnetic layer, and a first intermediate layer. The second conductive layer is provided between the first conductive layer and the film portion. The first magnetic layer is provided between the first conductive layer and the second conductive layer. The second magnetic layer is provided between the first magnetic layer and the second conductive layer. The first intermediate layer is provided between the first magnetic layer and the second magnetic layer. A curvature of the first conductive layer is different from a curvature of at least a portion of the film portion.

11 Claims, 19 Drawing Sheets

(56) References Cited

U.S. PATENT DOCUMENTS

| | | | |
|---|---|---|---|
| 2012/0206014 A1* | 8/2012 | Bibl | B06B 1/0644 |
| | | | 310/331 |
| 2013/0170669 A1 | 7/2013 | Fukuzawa et al. | |
| 2013/0255393 A1* | 10/2013 | Fukuzawa | G01L 1/12 |
| | | | 73/779 |
| 2015/0268116 A1* | 9/2015 | Fuji | H01L 43/12 |
| | | | 438/3 |
| 2016/0320899 A1* | 11/2016 | Watazu | G06F 3/047 |

FOREIGN PATENT DOCUMENTS

| | | | |
|---|---|---|---|
| JP | 2012-115585 | 6/2012 | |
| JP | 2013-072712 | 4/2013 | |
| JP | 2013-205403 | 10/2013 | |
| JP | 2015-179772 | 10/2015 | |
| WO | WO 2006002988 A1 * | 1/2006 | G01L 1/12 |

* cited by examiner

FIG. 6D

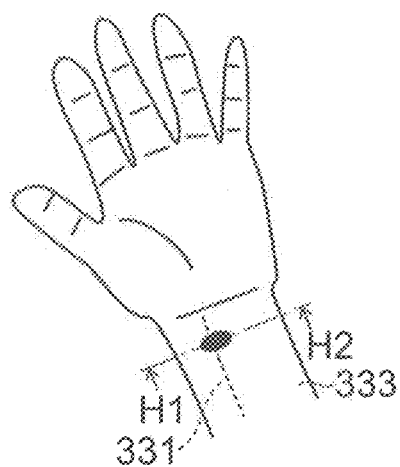
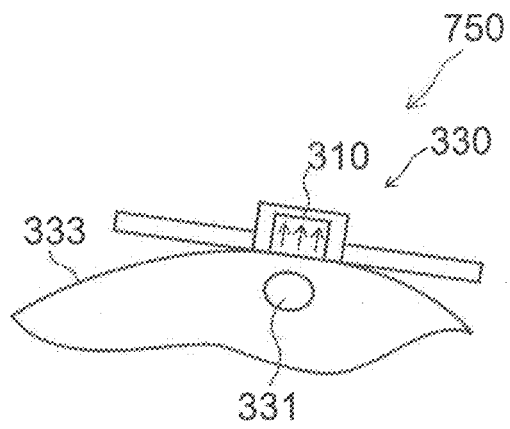
FIG. 26A    FIG. 26B
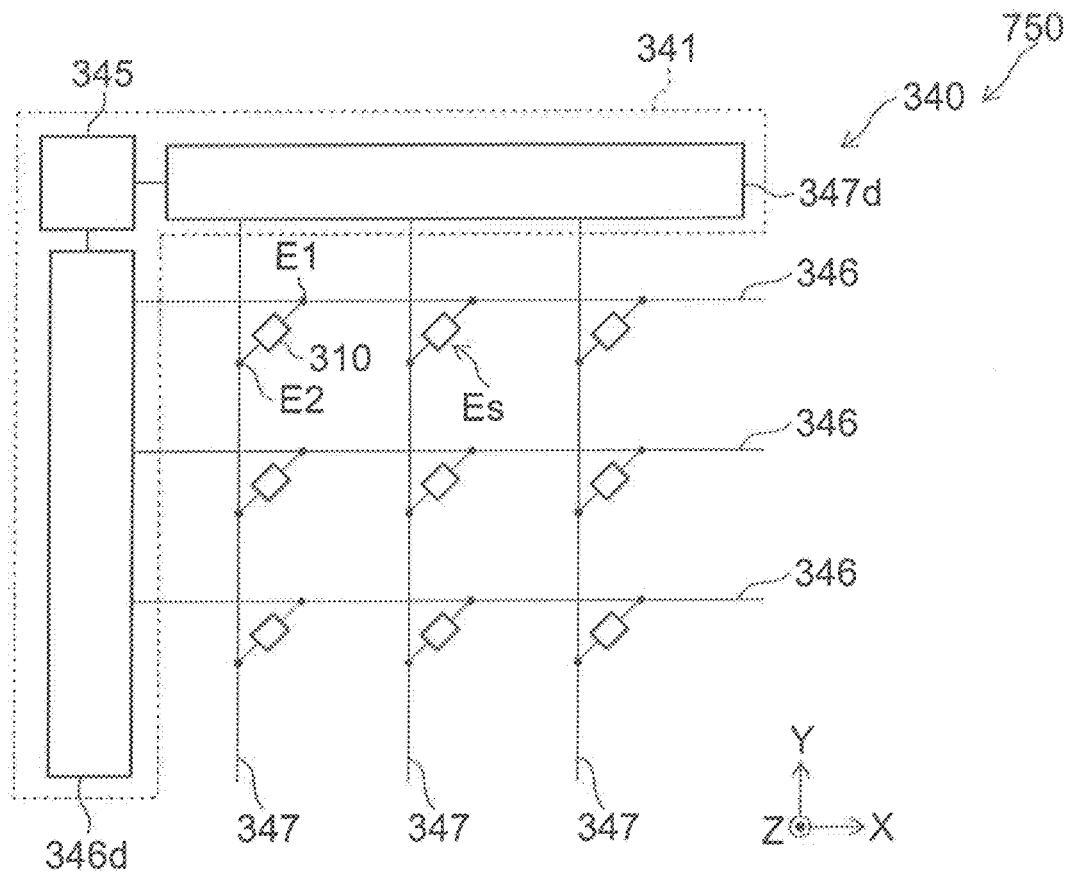
FIG. 27

SENSOR AND ELECTRONIC DEVICE

CROSS-REFERENCE TO RELATED APPLICATIONS

This application is based upon and claims the benefit of priority from Japanese Patent Application No. 2016-184183, filed on Sep. 21, 2016; the entire contents of which are incorporated herein by reference.

FIELD

Embodiments described herein relate generally to a sensor and an electronic device.

BACKGROUND

There is a sensor such as a pressure sensor or the like that converts pressure applied from the outside into an electrical signal. It is desirable to increase the sensitivity of the sensor.

BRIEF DESCRIPTION OF THE DRAWINGS

FIG. 6A to FIG. 6E are schematic views illustrating a sensor according to a second embodiment;

FIG. 26A and FIG. 26B are schematic views illustrating another electronic device according to the fifth embodiment; and FIG. 27 is a schematic view illustrating another electronic device according to the fifth embodiment.

DETAILED DESCRIPTION

Figure 1A:
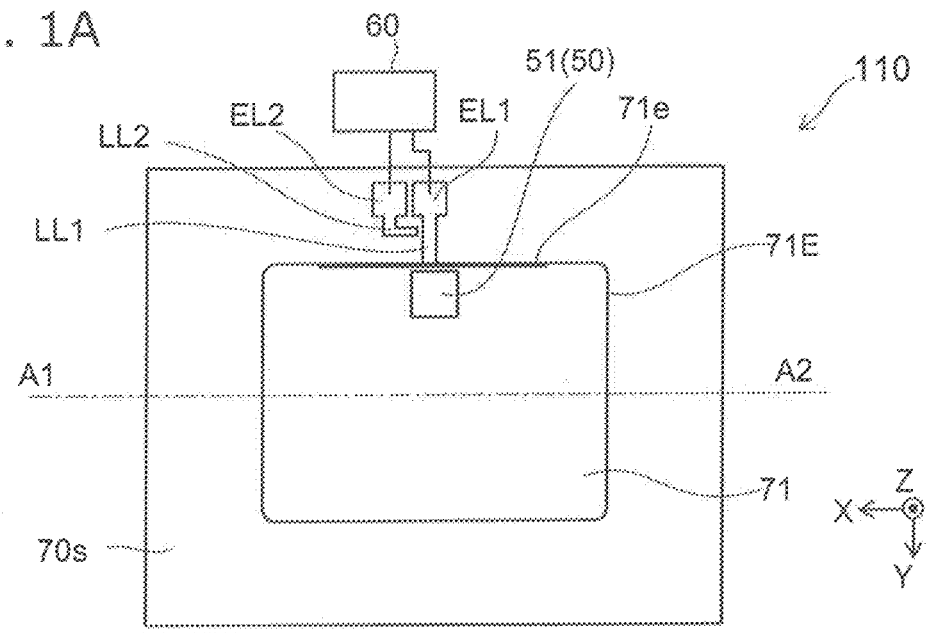
FIG. 1A to FIG. 1C are schematic views illustrating a sensor according to a first embodiment.

According to one embodiment, a sensor includes a film portion and a first sensor portion. The film portion is deformable. The first sensor portion is provided at the film portion. The first sensor portion includes a first conductive layer, a second conductive layer, a first magnetic layer, a second magnetic layer, and a first intermediate layer. The second conductive layer is provided between the first conductive layer and the film portion. The first magnetic layer is provided between the first conductive layer and the second conductive layer. The second magnetic layer is provided between the first magnetic layer and the second conductive layer. The first intermediate layer is provided between the first magnetic layer and the second magnetic layer. A curvature of the first conductive layer is different from a curvature of at least a portion of the film portion.

According to one embodiment, a sensor includes a film portion and a first sensor portion. The film portion is deformable. The first sensor portion is provided at the film portion. The first sensor portion includes a first magnetic layer, a second magnetic layer, and a first intermediate layer. The second magnetic layer is provided between the first magnetic layer and the film portion. The first intermediate layer is provided between the first magnetic layer and the second magnetic layer. A curvature of the first magnetic layer is different from the curvature of at least a portion of the film portion.

According to one embodiment, a sensor includes a film portion, an insulating film and a first sensor portion. The film portion is deformable. The first sensor portion is provided at the film portion. The first sensor portion includes a first magnetic layer, a second magnetic layer, and a first intermediate layer. The first magnetic layer is provided between the insulating film and the film portion. The second magnetic layer is provided between the first magnetic layer and the film portion. The first intermediate layer is provided between the first magnetic layer and the second magnetic layer. A curvature of the insulating film is different from a curvature of at least a portion of the film portion.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

Figure 1B:
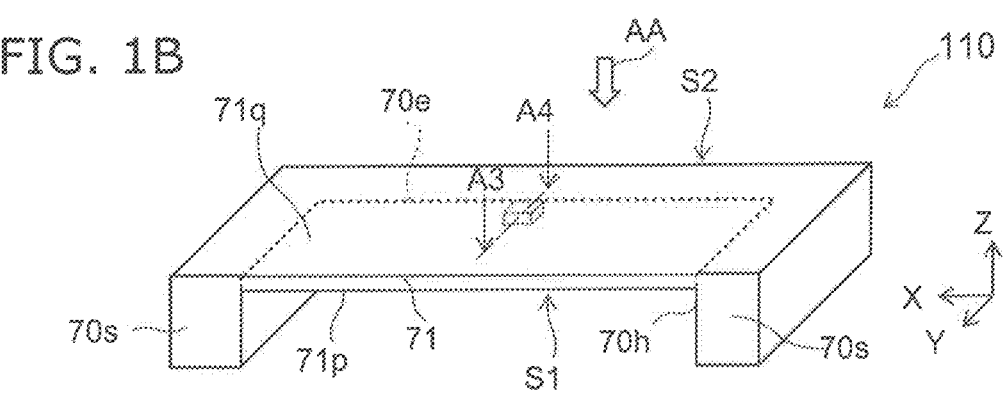
Figure 1C:
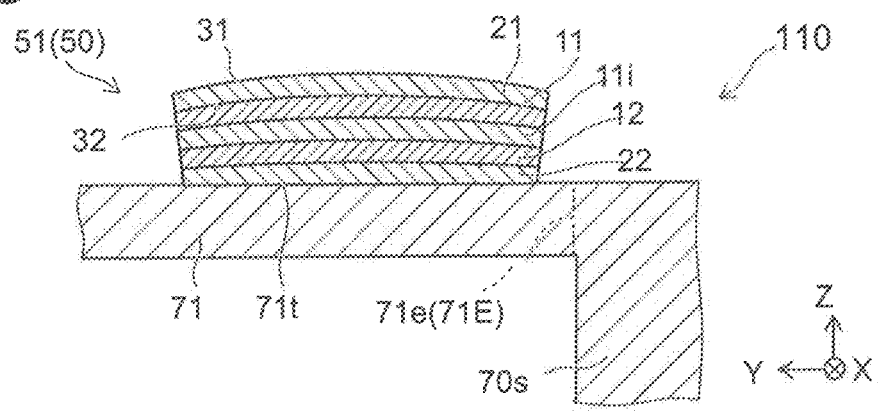

FIG. 1A to FIG. 1C are schematic views illustrating a sensor according to a first embodiment.

FIG. 1A illustrates a plan view of the sensor 110 according to the embodiment. FIG. 1A corresponds to a plan view as viewed along arrow AA of FIG. 1B. FIG. 1B is a schematic perspective view illustrating a cross section along line A1-A2 shown in FIG. 1A. FIG. 1C is a line A3-A4 cross-sectional view shown in FIG. 1B.

As shown in FIG. 1A and FIG. 1B, the sensor 110 includes a film portion 71 and a sensor portion 50 (a first sensor portion 51). The sensor 110 is, for example, a pressure sensor.

The film portion 71 is deformable. For example, the film portion 71 is a transducing thin film that is flexible. The film portion 71 is supported by a support portion 70s. For example, a recess 70h is formed in a portion of the substrate used to form the film portion 71 and the support portion 70s. The thin portion of the substrate is used to form the film portion 71. The thick portion of the substrate is used to form the support portion 70s. The support portion 70s is connected to the outer edge of the film portion 71. The planar shape of the film portion 71 is, for example, substantially a quadrilateral (including a rectangle, etc.), a circle (including a flattened circle), etc. The deformable film described above may have a free end. In the example, a portion (an extension portion 71e) of an outer edge 71E of the film portion 71 is connected to the support portion 70s. An extension portion 70e includes a portion (a side) of the outer edge 71E of the film portion 71 most proximal to the first sensor portion 51. For example, the film portion 71 can flex in a direction (e.g., the Z-axis direction) perpendicular to the film surface.

As shown in FIG. 1B, the film portion 71 has a first film surface 71p and a second film surface 71q. The second film surface 71q is the surface on the side opposite to the first film surface 71p. The film portion 71 is positioned between a first space S1 contacting the first film surface 71p, and a second space S2 contacting the second film surface 71q. The film portion 71 deforms when the pressure (the air pressure) from the first space S1 and the pressure (the air pressure) from the second space S2 are different. For example, the film portion 71 deforms due to pressure from the outside due to a sound wave, an ultrasonic wave, etc.

The film that is used to form the film portion 71 includes a portion that flexes due to the external pressure. The film portion 71 may include a portion on the outer side of the portion flexing due to the external pressure. In the film portion 71, for example, the portion flexing due to the external pressure and the portion on the outer side of the portion flexing due to the external pressure may be continuous. The film portion 71 is supported by the support portion 70s and flexes due to the external pressure.

FIG. 1B illustrates the sensor 110 in a state (hereinbelow, a first state) in which the air pressure of the first space S1 and the air pressure of the second space S2 are substantially the same. For example, in the first state, the pressure that is applied to the first film surface 71p from the outside and the pressure that is applied to the second film surface 71q from the outside are substantially equal. In the first state, for example, deformation due to the sensing object such as the sound wave, etc., does not occur in the film portion 71. In the first state, for example, the pressures of both the first space S1 and the second space S2 are atmospheric pressure.

In the example, the film portion 71 in the first state is substantially flat. In the embodiment, the film portion 71 in the first state may have an upward convex shape. In the embodiment, the film portion 71 in the first state may have a downward convex shape.

For example, the first sensor portion 51 (the sensor portion 50) is a strain sensing element sensing the deformation of the film portion 71. The first sensor portion 51 is provided at the film portion 71. For example, the first sensor portion 51 is provided on a portion of the film portion 71. The front and back (top and bottom) of the surfaces are arbitrary. It is desirable for the position where the sensor portion 50 is provided to be the position where the amount of strain of the film portion 71 is large. It is desirable for the position of the sensor portion 50 to be an outer edge vicinity (a peripheral portion) of the film portion 71.

As shown in FIG. 1A, the sensor 110 may include a first lead LL1, a second lead LL2, a first sensor electrode EL1, a second sensor electrode EL2, and a controller 60. The first sensor portion 51 is electrically connected to the controller 60 via the first lead LL1, the second lead LL2, the first sensor electrode EL1, and the second sensor electrode EL2. The controller 60 can sense a signal (an electrical resistance, etc.) from the first sensor portion 51.

In the embodiment, the state of being electrically connected includes not only the state in which the multiple conductors are in direct contact, but also the case where the multiple conductors are connected via another conductor. The state of being electrically connected includes the case where the multiple conductors are connected via an element having a function such as switching, amplification, etc.

A direction on a shortest line connecting the support portion 70s and the first sensor portion 51 is taken as a Y-axis direction (a first direction). One direction perpendicular to the Y-axis direction is taken as a Z-axis direction. The Z-axis direction corresponds to the direction connecting the film portion 71 and the first sensor portion 51. A direction perpendicular to the Y-axis direction and perpendicular to the Z-axis direction is taken as an X-axis direction. For example, the extension portion 70e extends along the X-axis direction.

As shown in FIG. 1C, the first sensor portion 51 includes a first magnetic layer 11, a second magnetic layer 12, a first intermediate layer 11l, a first conductive layer 21, and a second conductive layer 22.

The second conductive layer 22 is provided between the first conductive layer 21 and the film portion 71. The first magnetic layer 11 is provided between the first conductive layer 21 and the second conductive layer 22. The second magnetic layer 12 is provided between the first magnetic layer 11 and the second conductive layer 22. The first intermediate layer 11l is provided between the first magnetic layer 11 and the second magnetic layer 12. The first intermediate layer 11i is nonmagnetic.

For example, the first conductive layer 21 is electrically connected to the first sensor electrode EL1 described above. The second conductive layer 22 is electrically connected to the second sensor electrode EL2 described above.

Strain is generated in the first sensor portion 51 when the film portion 71 deforms. The magnetization of at least one of the first magnetic layer 11 or the second magnetic layer 12 changes according to the deformation of the film portion 71. Stress (e.g., tensile stress in the surface) is applied to the sensor portion 50 by the deformation of the film portion 71; and the angle between the magnetization of the first magnetic layer 11 and the magnetization of the second magnetic layer 12 changes according to the deformation of the film portion 71. The electrical resistance (the electrical resistance of the first sensor portion 51) between the first magnetic layer 11 and the second magnetic layer 12 changes due to the change of this angle. For example, the controller 60 senses the change of the electrical resistance between the first sensor electrode EL1 and the second sensor electrode EL2. The pressure that is applied to the film portion 71 can be sensed.

In the example, the first magnetic layer 11 is a free layer (a free magnetic layer), and the second magnetic layer 12 is a reference layer (a magnetization reference layer). For example, the first magnetic layer 11 may be a reference layer; and the second magnetic layer 12 may be a free layer. Both the first magnetic layer 11 and the second magnetic layer 12 may be free layers. The description relating to the first sensor portion 51 described above is applicable also to the other sensor portions 50 (a second sensor portion 52, etc.) described below.

As shown in FIG. 1C, the curvature of the first conductive layer 21 is different from the curvature of at least a portion of the film portion 71. For example, the curvature (the absolute value of the curvature) of the first conductive layer 21 is higher than the curvature (the absolute value of the curvature) of at least a portion of the film portion 71. For example, the first conductive layer 21 is curved (bent) in the first state (the initial state) in which the external pressure is not applied to the first sensor portion 51. The first conductive layer 21 has a first conductive layer surface 31 and a second conductive layer surface 32. The second conductive layer surface 32 is positioned between the first conductive layer surface 31 and the film portion 71. In the embodiment, the first conductive layer surface 31 is curved in the first state. The curvature (the absolute value of the curvature) of the first conductive layer 21 may be lower than the curvature (the absolute value of the curvature) of at least a portion of the film portion 71.

When the pressure (the strain) that is applied to the film portion 71 is sensed by the first sensor portion 51, there are cases where the sensitivity of the sensing is offset with respect to the strain. For example, it was found that there are cases where the sensitivity of the sensing is high when the strain is not 0, and the sensitivity of the sensing is low when the strain is 0. For example, it is considered that this is caused by strain generated in the magnetic layers included in the first sensor portion 51 when manufacturing the first sensor portion 51, etc.

In the embodiment, the first conductive layer 21 is curved in the first state in which the external pressure is not applied to the first sensor portion 51. For example, an initial strain bias is applied to the magnetic layer of the first sensor portion 51. For example, the initial strain bias acts to weaken the residual strain of the magnetic layer. Highly-sensitive sensing is possible for the external pressure in the desired range. According to the embodiment, a sensor can be provided in which the sensitivity can be increased.

For example, the first conductive layer 21 can be curved by appropriately setting the relationship between the thickness of the first conductive layer 21 and the thickness of the second conductive layer 22. For example, in the case where these materials are substantially the same, for example, the upper surface of the first conductive layer 21 is curved by setting the thickness of the first conductive layer 21 to be thinner than the thickness of the second conductive layer 22. The curved state can be obtained also by setting the material of the first conductive layer 21 to be different from the material of the second conductive layer 22.

For example, there are cases where residual stress is applied due to the difference between the thermal history of the first conductive layer 21 and the thermal history of the second conductive layer 22. For example, the states of the conductive layers are controlled to weaken such residual stress. The appropriate initial strain bias is introduced to the magnetic layer.

On the other hand, for example, a method may be considered in which the initial strain of the magnetic layer is adjusted by causing the film portion 71 to deform in the initial state. Conversely, in the embodiment, the first sensor portion 51 is caused to deform in the initial state. Therefore, compared to the case where the film portion 71 is caused to deform, the strain of the magnetic layer can be adjusted more directly and more effectively. In the embodiment, the film portion 71 may be caused to deform in the initial state in addition to causing the first sensor portion 51 to deform (curve) in the initial state.

In FIG. 1B, the curve that is introduced to the first sensor portion 51 (the first conductive layer 21) is upwardly convex. The state of the upward convex curve is taken as a state of positive initial strain bias. Conversely, a state of a downward convex curve is taken as a state of negative initial strain bias.

In the embodiment, the polarity (the direction of the curve) of the initial strain bias may be controlled based on the state of the residual stress generated in the first sensor portion 51, the state of the pressure that is to be sensed, etc.

The state of the curve introduced to the first sensor portion 51 (the first conductive layer 21) can be sensed using light (e.g., interferometry, etc.). A white-light interferometer can be used to measure the state of the curve. A laser displacement sensor may be used to measure the state of the curve. For example, when performing the measurement using coherent light in the state in which the sensor is disassembled, it is taken that the state (the first state) in which the air pressure of the first space S1 and the air pressure of the second space S2 are substantially the same is obtained when the space (the second space S2) on the upper side of the film portion 71 and the space (the first space S1) on the lower side of the film portion 71 both are atmospheric pressure.

An example of the characteristics of the sensor portion will now be described.

Figure 2A:
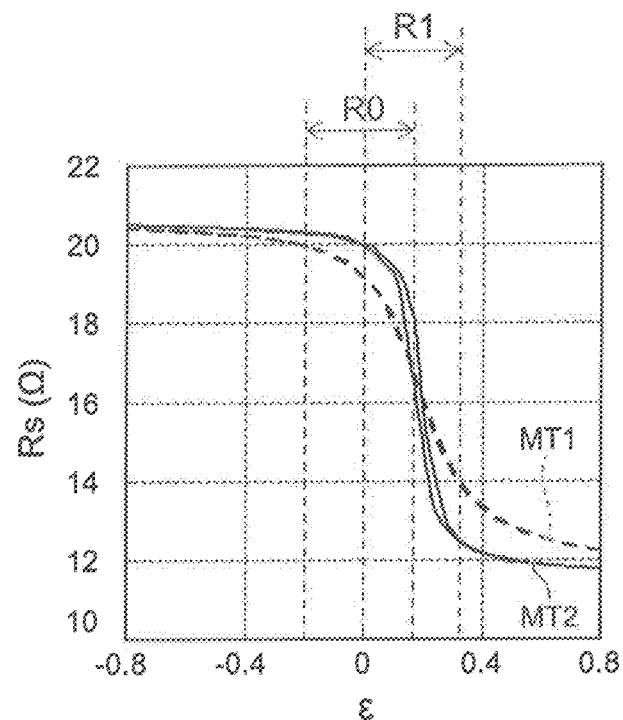
FIG. 2A and FIG. 2B are graphs illustrating the characteristics of the sensor.
Figure 2B:
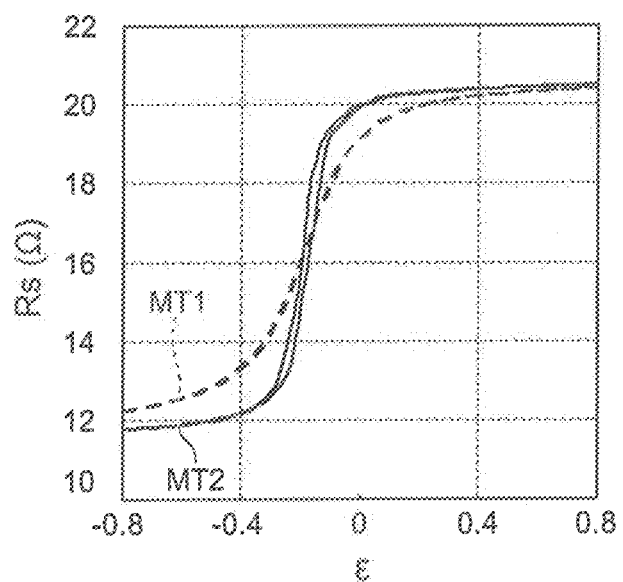

FIG. 2A and FIG. 2B are graphs illustrating the characteristics of the sensor.

The horizontal axis shows a strain a (per mille, $\frac{1}{1000}$) of the sensor portion 50 (the first sensor portion 51). The vertical axis is an electrical resistance Rs (Ω) of the first sensor portion 51. In the figures, the cases where a first material MT1 and a second material MT2 are used as the free layer of the first sensor portion 51 are shown. The gauge factor of the first material MT1 is 1500. The gauge factor of the second material MT2 is 4000. In these samples, the front surface of the first sensor 51 (the front surface of the first conductive layer 21) is substantially flat in the state in which the external pressure is not applied.

In the example, the change rate of the electrical resistance Rs with respect to the strain a is higher for the second material MT2 than for the first material MT1. In either of these materials, when the strain ε is not 0 (e.g., in region R1 shown in FIG. 2A), a large change of the electrical resistance Rs is obtained. In region R0 where the absolute value of the strain ε is small, the change of the electrical resistance Rs is small; and the sensitivity is low.

Conversely, in the embodiment, the curvature of the first conductive layer 21 is different from the curvature of the film portion 71. For example, the first conductive layer 21 is curved in the first state in which the external pressure is not applied to the first sensor portion 51. An initial strain bias is applied to the first sensor portion 51 in the state in which the external pressure is not applied. For example, the first sensor portion 51 can be operated in an operation region (e.g., region R1 shown in FIG. 2A) having high sensitivity. According to the embodiment, a sensor can be provided in which the sensitivity can be increased.

In the example shown in FIG. 2A and FIG. 2B, the λs (the magnetostriction constant) of the free layer is positive. In the example shown in FIG. 2A, the direction of the strain ε is perpendicular to the orientation of the magnetization of the second magnetic layer 12. In such a case, a positive initial strain bias is applied to the first sensor portion 51. For example, the first conductive layer 21 has an upward convex shape. For example, an operation region that has high sensitivity such as region R1 can be used. For example, the curvature (the reciprocal of the curvature radius) of the first conductive layer surface 31 may be set according to the magnetic material of the first magnetic layer 11, etc. For example, in the case where the first magnetic layer 11 includes FeB, it is desirable for the initial strain bias to be greater than 0 but not more than 0.35 (per mille). At this time, the curvature ($\rho$ ($mm^{-1}$)) of the first conductive layer surface 31 is 0<$\rho$≤2.0.

In the example shown in FIG. 2B, the direction of the strain ε is parallel to the orientation of the magnetization of the second magnetic layer 12. In such a case, a negative initial strain bias is applied to the first sensor portion 51. For example, the first conductive layer 21 has a downward convex shape. Thereby, an operation region that has high sensitivity can be used.

An example of the state in which the first conductive layer 21 (the first conductive layer surface 31) is curved is described below.

Figure 3:
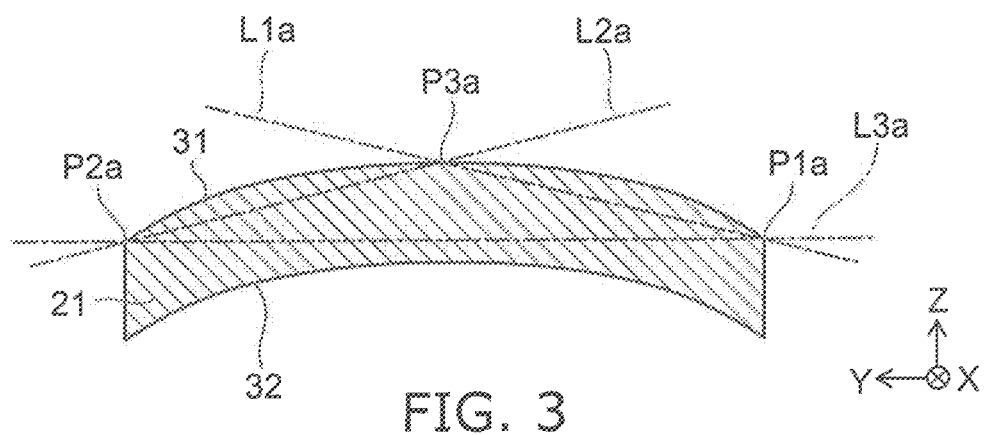
FIG. 3 is a schematic cross-sectional view illustrating a portion of the sensor according to the first embodiment.

FIG. 3 is a schematic cross-sectional view illustrating a portion of the sensor according to the first embodiment.

The first conductive layer surface 31 includes first to third points P1a to P3a. The third point P3a is positioned between the first point P1a and the second point P2a on the first conductive layer surface 31. The first to third points P1a to P3a are positioned in the Y-Z plane. The Y-Z plane corresponds to a plane including the first direction on the shortest line connecting the support portion 70s and the first sensor portion 51 and a second direction from the second magnetic layer 12 toward the first magnetic layer 11. For example, the first point P1a and the second point P2a are positioned at the ends of the first conductive layer surface 31; and the third point P3a is positioned at the center of the first conductive layer surface 31. A first straight line L1a that connects the first point P1a and the third point P3a is tilted with respect to a second straight line L2a connecting the second point P2a and the third point P3a.

In the example, the first conductive layer 21 has an upward convex shape in the first state. A third straight line L3a that connects the first point P1a and the second point P2a is positioned between the film portion 71 and the third point P3a. As described below, the first conductive layer 21 may have a downward convex shape in the first state. The first magnetic layer 11, the first intermediate layer 11i, the second magnetic layer 12, and the second conductive layer 22 may be curved similarly to the first conductive layer 21. The curvature ($\rho$) of the first conductive layer surface 31 corresponds to the shape of the first conductive layer surface 31 in a cross section parallel to the Z-Y plane.

As shown in FIG. 1C, the film portion 71 includes a film portion region 71t where the first sensor portion 51 is provided. For example, the film portion region 71t is the region of the surface of the film portion 71 contacting the first sensor portion 51. For example, the curvature of the first conductive layer surface 31 is different from the curvature of the film portion region 71t. For example, the sign (positive or negative) of the curvature of the film portion region 71t may be the same as the sign of the curvature of the first conductive layer surface 31. For example, the curvature (the absolute value of the curvature) of the film portion region 71t is lower than the curvature (the absolute value of the curvature) of the first conductive layer surface 31. The curvature of the film portion region 71t may be zero. The sign of the curvature of the film portion region 71t may be the reverse of the sign of the curvature of the first conductive layer surface 31. The curvature ($\rho$) of the film portion region 71t corresponds to the shape of the film portion region 71t in a cross section parallel to the Z-Y plane.

At least one of the first conductive layer 21 or the second conductive layer 22 includes, for example, at least one selected from the group consisting of Al (aluminum), Cu (copper), Ag (silver), and Au (gold). At least one of the first magnetic layer 11 or the second magnetic layer 12 includes, for example, Fe (iron), Co (cobalt), and NI (nickel). The first intermediate layer 11i includes, for example, a metal, an insulator, or a semiconductor. The intermediate layer 11ii includes, for example, MgO, etc. Examples of the materials, thicknesses, and the like of these conductive layers, these magnetic layers, and the intermediate layer 11i are described below.

The film portion 71 includes, for example, an insulator. The film portion 71 may include, for example, a metal. The film portion 71 includes, for example, at least one of silicon oxide, silicon nitride, or aluminum oxide. The thickness of the film portion 71 is, for example, not less than 200 nm and not more than 3 μm. Favorably, the thickness of the film portion 71 is, for example, not less than 300 nm and not more than 1.5 μm. The width (e.g., the length in a direction aligned with the X-Y plane) of the film portion 71 is, for example, not less than 1 m and not more than 2000 μm. More favorably, the width is not less than 60 μm and not more than 1500 μm. In the case where the film portion 71 has a rectangular shape, the length of one side of the film portion 71 is, for example, not less than 1 μm and not more than 2000 μm.

Figure 4A:
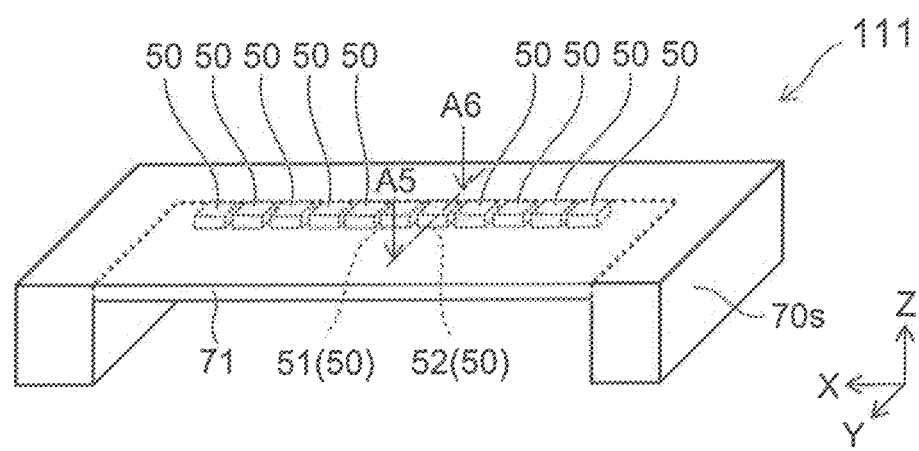
FIG. 4A and FIG. 4B are schematic views illustrating a sensor according to the first embodiment.
Figure 4B:
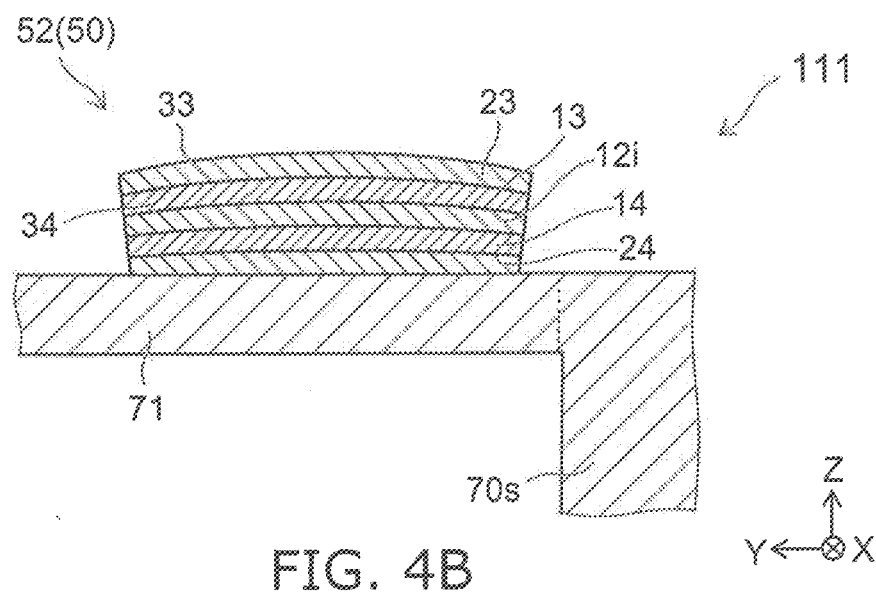

FIG. 4A and FIG. 4B are schematic views illustrating a sensor according to the first embodiment.

The sensor 111 according to the embodiment shown in FIG. 4A includes the multiple sensor portions 50. Otherwise, a description similar to that of the sensor 110 is applicable to the sensor 111. Similarly to FIG. 1B, FIG. 4A illustrates the cross section of the sensor 111. The multiple sensor portions 50 include the first sensor portion 51 and the second sensor portion 52. For example, the multiple sensor portions 50 are arranged along the X-axis direction.

FIG. 4B shows a cross section of the sensor 111 along line A5-A6 shown in FIG. 4A. The second sensor portion 52 includes a third magnetic layer 13, a fourth magnetic layer 14, a second intermediate layer 12i, a third conductive layer 23, and a fourth conductive layer 24.

The fourth conductive layer 24 is provided between the third conductive layer 23 and the film portion 71. The third magnetic layer 13 is provided between the third conductive layer 23 and the fourth conductive layer 24. The fourth magnetic layer 14 is provided between the third magnetic layer 13 and the fourth conductive layer 24. The second intermediate layer 12i is provided between the third magnetic layer 13 and the fourth magnetic layer 14. In the example, the third magnetic layer 13 is a free layer; and the fourth magnetic layer 14 is a reference layer.

The third conductive layer 23 is curved in the first state (the initial state) in which the external pressure is not applied to the second sensor portion 52. The third conductive layer 23 has a third conductive layer surface 33 and a fourth conductive layer surface 34. The fourth conductive layer surface 34 is positioned between the third conductive layer surface 33 and the film portion 71. The third conductive layer surface 33 is curved in the first state.

The shape of the curve of the third conductive layer 23 (and the third conductive layer surface 33) are similar to those of the first conductive layer 21 (and the first conductive layer surface 31) described above. In the example, similarly to the description relating to FIG. 3, the third conductive layer 23 (and the third conductive layer surface 33) have upward convex shapes.

At least two of the multiple sensor portions 50 may be connected in series. By providing the multiple sensor portions 50, the sensitivity of the sensor 111 can be increased. The conductive layers (the first conductive layer 21, the third conductive layer 23, etc.) are curved for each of the multiple sensor portions 50. According to the sensor 111, the sensitivity can be increased further.

Figure 5:
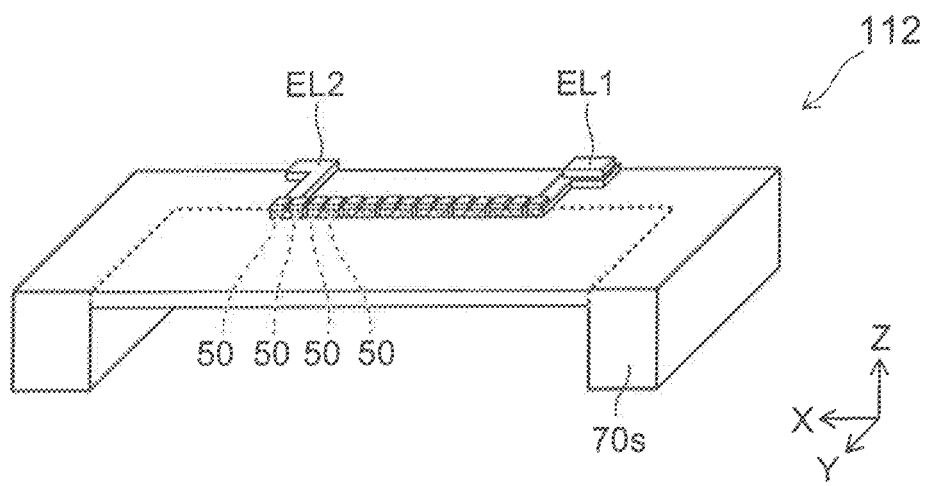
FIG. 5 is a schematic view illustrating a sensor according to the first embodiment.

FIG. 5 is a schematic view illustrating a sensor according to the first embodiment.

Similarly to the sensor 111 described above, the sensor 112 according to the embodiment shown in FIG. 5 includes the multiple sensor portions 50. In the sensor 112, for example, the multiple sensor portions 50 are connected in series. One end of the multiple sensor portions 50 is electrically connected to the first sensor electrode EL1. One other end of the multiple sensor portions 50 is electrically connected to the second sensor electrode EL2. By connecting the multiple sensor portions 50 in series, the signal from the multiple sensor portions 50 can be large. The sensing object such as the pressure, etc., can be sensed with high precision.

Second Embodiment

FIG. 6A to FIG. 6E are schematic views illustrating a sensor according to a second embodiment.

Figure 6A:
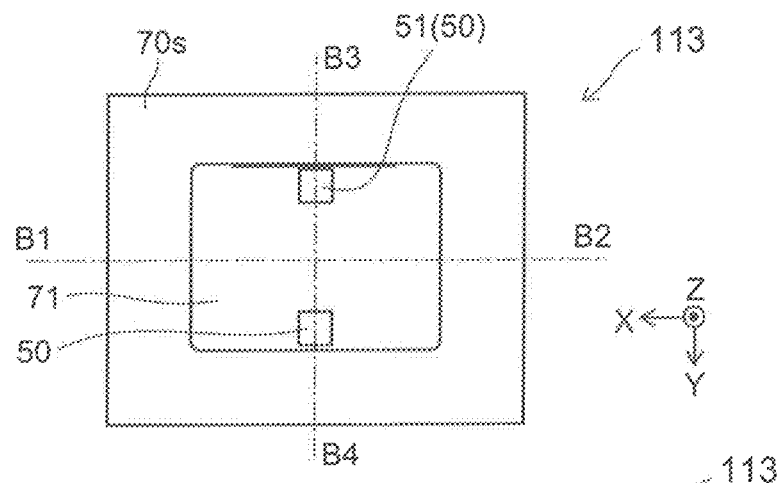

FIG. 6A is a schematic plan view illustrating the sensor 113 according to the embodiment.

Figure 6B:
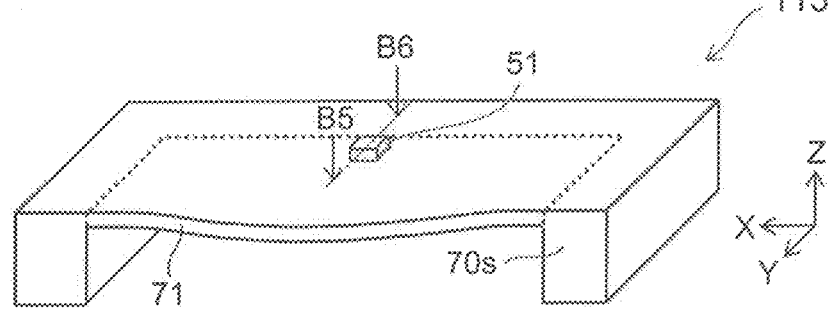

FIG. 6B is a schematic perspective view illustrating a cross section of the sensor 113 along line B1-B2 shown in FIG. 6A.

Figure 6C:
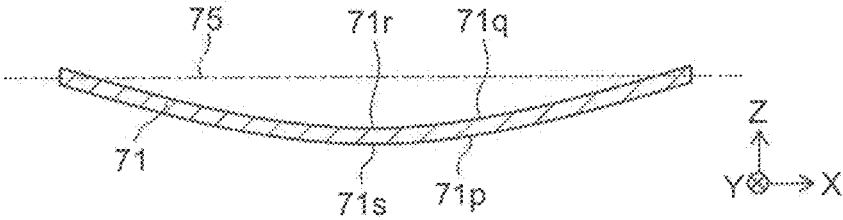

FIG. 6C is a schematic cross-sectional view along line B1-B2 of the film portion 71.

FIG. 6D is a schematic cross-sectional view of the film portion 71 and the sensor portion 50 (the first sensor portion 51) along line B3-B4 shown in FIG. 6A.

FIG. 6A to FIG. 6D illustrate the sensor 113 in the first state. In the embodiment as shown in these drawings, the film portion 71 is not flat in the first state.

As shown in FIG. 6B to FIG. 6D, the film portion 71 has a downward convex shape in the first state. For example, as shown in FIG. 6C, a second film center 71$r$ (the centroid) of the second film surface 71$q$ is positioned between a first film center 71$s$ (the centroid) of the first film surface 71$p$ and a plane 75 including the outer edge of the film portion 71.

Figure 6E:
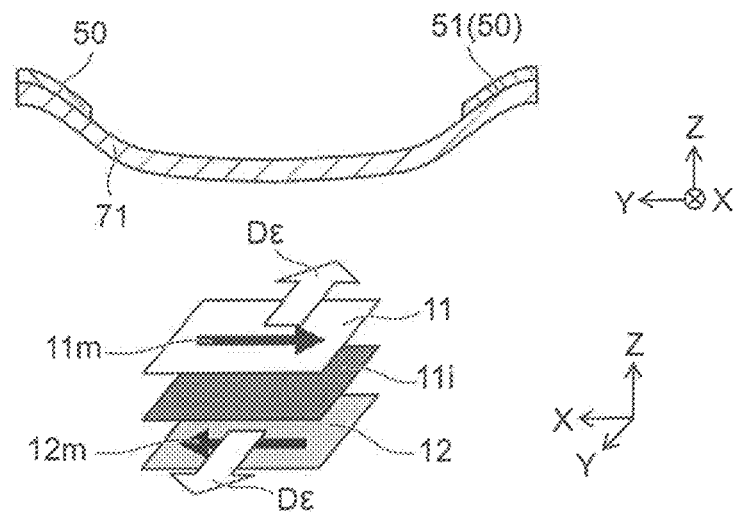

FIG. 6E is a schematic view illustrating the magnetization directions of the magnetic layers of the first sensor portion 51 and the direction of the strain generated in the first sensor portion 51. In the example, the first magnetic layer 11 is a free layer; and the second magnetic layer 12 is a reference layer. For example, a second magnetization 12$m$ of the second magnetic layer 12 is substantially fixed in a direction along the X-axis direction (the third direction). For example, a first magnetization 11$m$ of the first magnetic layer 11 is aligned with the X-axis direction in the first state. The first magnetization 11$m$ is in the reverse direction of the second magnetization 12$m$ in the first state.

In the sensor 113, the magnetostriction constant (λs) of the first magnetic layer 11 is positive. The magnetostriction constant (λs) indicates the magnitude of the shape deformation when the ferromagnetic layer has saturation magnetization in some direction by applying an external magnetic field. For a length L along some direction of the ferromagnetic layer in the state in which there is no external magnetic field, the magnetostriction constant λs is ΔL/L, where the length changes by ΔL when the external magnetic field is applied. Although the change amount changes with the magnitude of the magnetic field, the magnetostriction constant λs is ΔL/L in the state in which a sufficient magnetic field is applied and the magnetization is saturated. In the case where the sign of the magnetostriction constant is positive, the direction in which the tensile stress is applied is the easy magnetization axis. In such a case, the magnetization of the first magnetic layer 11 (the free layer) rotates in the direction of the easy magnetization axis. On the other hand, in the case where the magnetostriction constant is negative, a direction perpendicular to the direction in which the tensile stress is applied is the easy magnetization axis.

As shown in FIG. 6E, stress (strain) in a direction $D_\varepsilon$ is applied in the first sensor portion 51. The direction $D_\varepsilon$ is a direction along the Y-axis direction. Strain is generated in a direction perpendicular to the direction of the magnetization of the reference layer. In such a case, a positive initial strain bias is applied to the first sensor portion 51. In the example as shown in FIG. 6D, the first sensor portion 51 (the first conductive layer 21) has an upward convex shape.

Figure 7A:
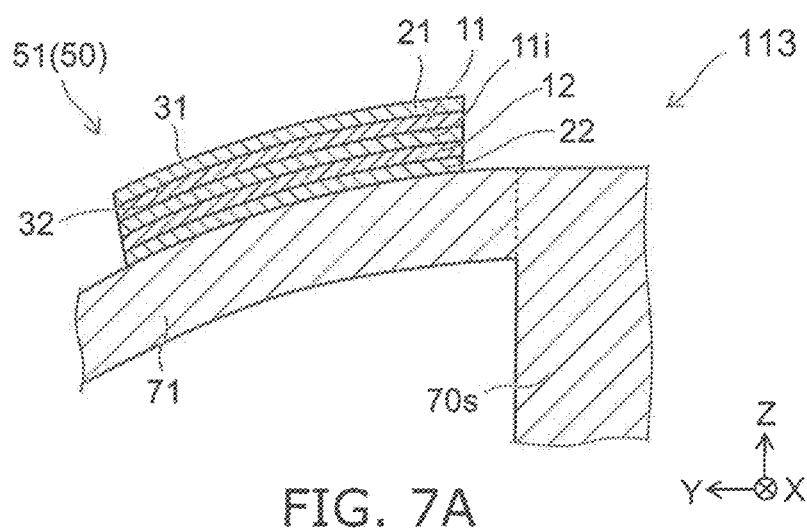
FIG. 7A and FIG. 7B are schematic cross-sectional views illustrating a portion of the sensor according to the second embodiment.
Figure 7B:
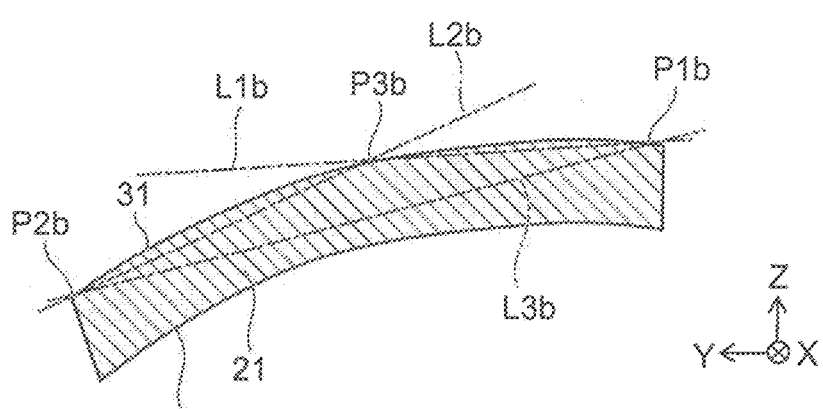

FIG. 7A and FIG. 7B are schematic cross-sectional views illustrating a portion of the sensor according to the second embodiment.

FIG. 7A shows a cross section of the sensor 113 along line B5-B6 shown in FIG. 6B. FIG. 7B shows the enlarged first conductive layer 21 shown in FIG. 7A. As shown in FIG. 7B, the first conductive layer 21 and the first conductive layer surface 31 have upward convex shapes.

As shown in FIG. 7B, the first conductive layer surface 31 includes first to third points P1$b$ to P3$b$. The third point P3$b$ is positioned between the first point P1$b$ and the second point P2$b$ on the first conductive layer surface 31. The first to third points P1$b$ to P3$b$ are positioned in the Y-Z plane. For example, the first point P1$b$ and the second point P2$b$ are positioned at the ends of the first conductive layer surface 31; and the third point P3$b$ is positioned at the center of the first conductive layer surface 31. A first straight line L1$b$ that connects the first point P1$b$ and the third point P3$b$ is tilted with respect to a second straight line L2$b$ connecting the second point P2$b$ and the third point P3$b$. A third straight line L3$b$ that connects the first point P1$b$ and the second point P2$b$ is positioned between the film portion 71 and the third point P3$b$.

Thus, the first conductive layer 21 is curved. An appropriate initial strain bias is applied to the magnetic layer of the first sensor portion 51. The sensitivity of the first sensor portion 51 can be high.

The film portion 71 is, for example, flat or downwardly convex in the first state. In the embodiment, the film portion 71 is upwardly convex in the first state.

Figure 8:
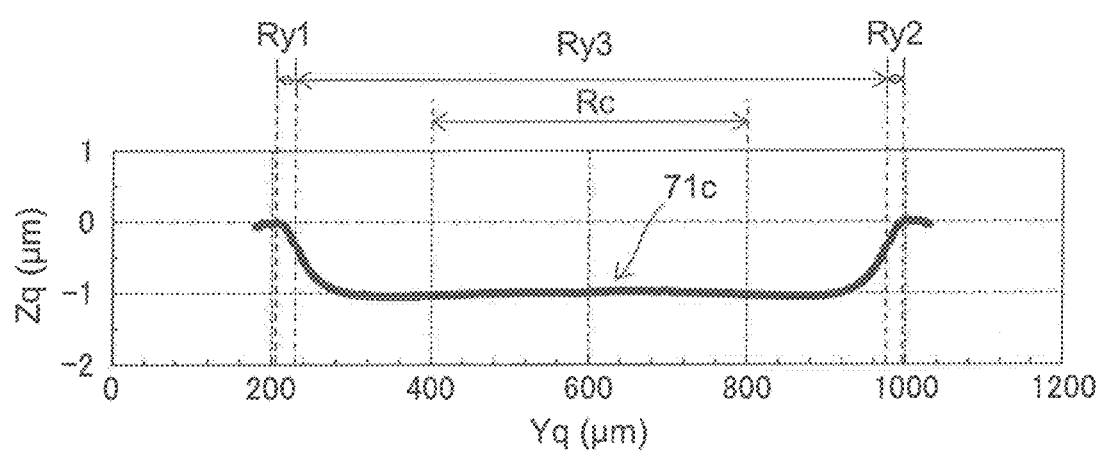
FIG. 8 is a graph illustrating the shape of the sensor according to the embodiment.

FIG. 8 is a graph illustrating the shape of the sensor according to the embodiment.

FIG. 8 illustrates the shape of the sensor 113 shown in FIG. 6A to FIG. 6E in the first state. The vertical axis of FIG. 8 illustrates a position Zq (μm) in the Z-axis direction of the film portion 71 (e.g., the second film surface 71q) and the first conductive layer 21 (e.g., the first conductive layer surface 31). The vertical axis of FIG. 8 illustrates a position Yq (μm) in the Y-axis direction.

A range Ry1 and a range Ry2 shown in FIG. 8 correspond to the shape of the first conductive layer 21. A range Ry3 shown in FIG. 8 corresponds to the shape of the film portion 71. As shown in FIG. 8, the curvature of the first conductive layer 21 (the first conductive layer surface 31) is different from the curvature of at least a portion of the film portion 71 (the second film surface 71q). For example, the curvature of the first conductive layer 21 is higher than the curvature of a center 71c of the film portion 71. The center 71c is the center of the film portion 71 in a direction (e.g., the Y-axis direction) perpendicular to the Z-axis direction.

The film portion 71 includes a region Rc including the center 71c. The region Rc is a region extending along a fourth direction connecting the first sensor portion 51 and the center 71c of the film portion 71. The fourth direction is, for example, the Y-axis direction. The length along the fourth direction of the region Rc is, for example, not less than 0.5 times and not more than 0.8 times the length along the fourth direction of the film portion 71. For example, in a plane including the fourth direction and the Z-axis direction, the curvature of the first conductive layer 21 is higher than the curvature of the region Rc.

Figure 9:
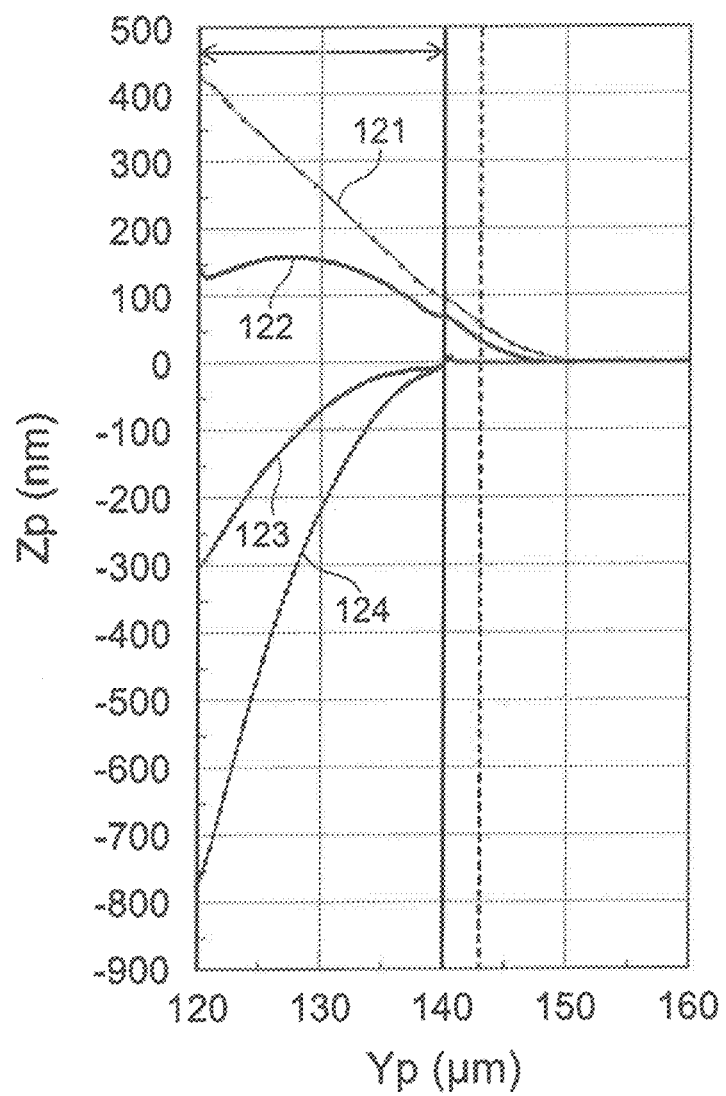
FIG. 9 is a graph illustrating shapes of sensors.

FIG. 9 is a graph illustrating shapes of sensors.

FIG. 9 illustrates the shape of the first conductive layer surface 31 for sensors 121 to 124. In the sensors 121 to 124, the concave or convex shape of the film portion 71 and the concave or convex shape of the first conductive layer surface 31 are different from each other. The planar size of the sensor portion is about 20 μm×20 μm.

The vertical axis of FIG. 9 illustrates a position Zp (nm) of the first conductive layer surface 31 in the Z-axis direction. The horizontal axis of FIG. 9 illustrates a position Yp (μm) in the Y-axis direction. The position Zp corresponds to the shape of the film portion 71 in the range in which the value of the horizontal axis is less than 120 μm. The position Zp corresponds to the shape of the first conductive layer surface 31 provided on the first magnetic layer 11 in the range in which the value of the horizontal axis is not less than 120 μm and not more than 140 μm. The position Zp corresponds to the support portion 70s in the range in which the value of the horizontal axis exceeds 140 μm.

Figure 10A:
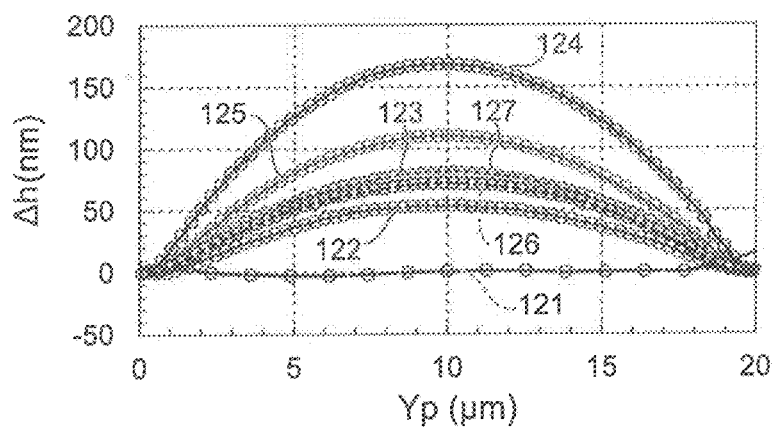
FIG. 10A to FIG. 10C are graphs illustrating the shapes of the sensors.
Figure 10B:
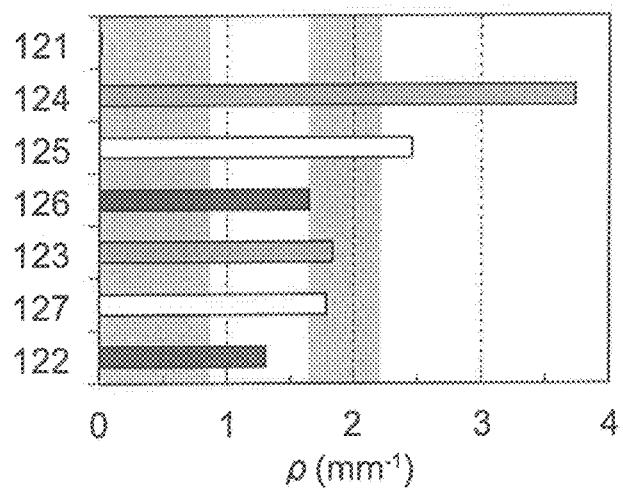
Figure 10C:
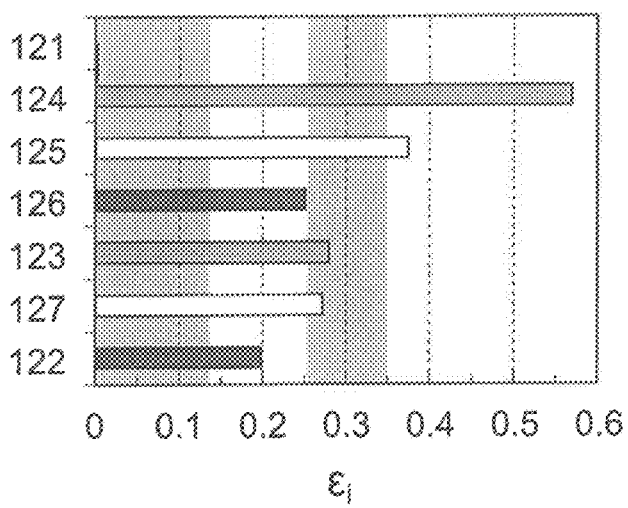

FIG. 10A to FIG. 10C are graphs illustrating the shapes of the sensors.

FIG. 10A illustrates the shape of the curve of the first conductive layer surface 31 for the sensors 121 to 124 and sensors 125 to 127 described above. The vertical axis of FIG. 10A illustrates a Z-direction displacement Δh (nm) of the first conductive layer surface 31. The Z-direction displacement Δh (nm) is obtained by rotating the shape of the first conductive layer surface 31 illustrated by the position Zp (nm) shown in FIG. 9.

The horizontal axis of FIG. 10A illustrates the position Yp (μm) in the Y-axis direction.

FIG. 10B illustrates the curvature ρ (mm$^{-1}$) of the first conductive layer surface 31 calculated from the data shown in FIG. 10A.

FIG. 10C illustrates the values of the curvature ρ shown in FIG. 10B converted into an initial strain bias εi (per mille) applied to the first sensor portion 51.

In the sensor 121, the curvature ρ is near zero; and the initial strain bias εi is near zero. In the sensor 124, the curvature ρ is about 3.7 (mm$^{-1}$); and the initial strain bias εi is about 0.56 (per mille). In the sensor 125, the curvature ρ is about 2.4 (mm$^{-1}$); and the initial strain bias εi is about 0.37 (per mille). In the sensor 126, the curvature ρ is about 1.67 (mm$^{-1}$); and the initial strain bias εi is about 0.25 (per mille). In the sensors 123 and 127, the curvature ρ is about 1.8 (mm$^{-1}$); and the initial strain bias εi is about 0.275 (per mille). In the sensor 122, the curvature ρ is about 1.3 (mm$^{-1}$); and the initial strain bias εi is about 0.2 (per mille). Thus, the initial strain bias εi becomes large when the curvature ρ becomes large.

As illustrated in FIGS. 2A and 2B, there is an offset in the characteristic of the change of the electrical resistance with respect to the strain; and the initial strain bias is set according to the offset. The range of the curvature of the first conductive layer surface 31 is set according to the desired initial strain bias.

In the embodiment, for example, the curvature (ρ) of the first conductive layer surface 31 is set to $0<\rho\leq2.0$ (mm$^{-1}$) in the case where the material of the first magnetic layer 11 includes FeB. The curvature (ρ) of the first conductive layer surface 31 may be $0.1\leq\rho\leq2.0$ (mm$^{-1}$). For example, the stress of multiple layers provided in the sensor portion is adjusted according to the materials of the multiple layers, the thicknesses of the multiple layers, etc. Thereby, the degree (e.g., the curvature) of the curve can be adjusted.

FIG. 11A to FIG. 11E are schematic views illustrating a sensor according to the second embodiment.

Figure 11A:
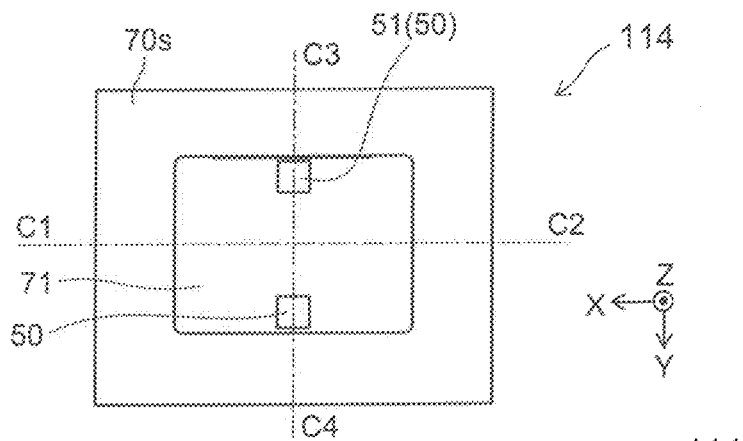
FIG. 11A to FIG. 11E are schematic views illustrating a sensor according to the second embodiment.

FIG. 11A is a schematic plan view illustrating the sensor 114 according to the embodiment.

Figure 11B:
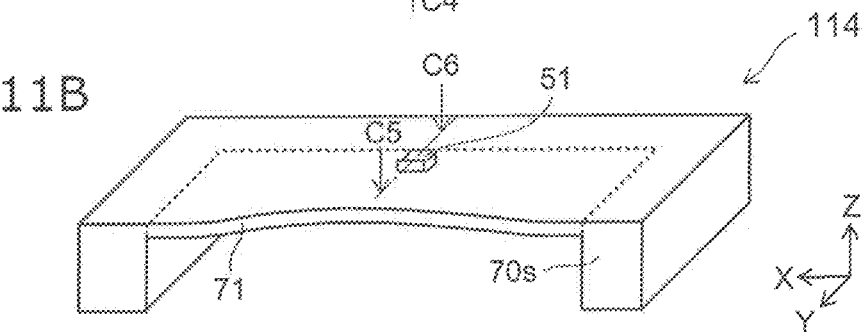

FIG. 11B is a schematic perspective view illustrating a cross section of the sensor 114 along line C1-C2 shown in FIG. 11A.

Figure 11C:
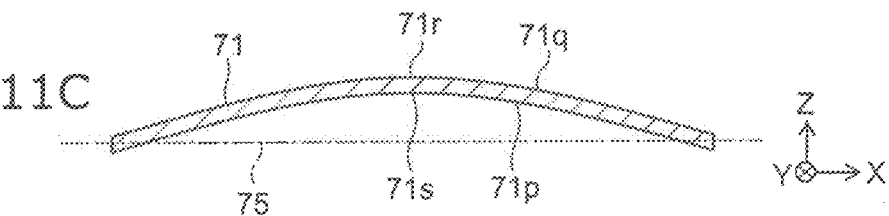

FIG. 11C is a schematic cross-sectional view along line C1-C2 of the film portion 71.

Figure 11D:
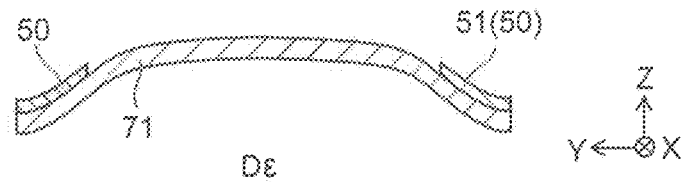

FIG. 11D is a schematic cross-sectional view of the film portion 71 and the sensor portion 50 (the first sensor portion 51) along line C3-C4 shown in FIG. 11A.

FIG. 11A to FIG. 11D illustrate the sensor 114 in the first state.

As shown in FIG. 11B to FIG. 11D, the film portion 71 has an upward convex shape in the first state. For example, as shown in FIG. 11C, the first film center 71s of the first film surface 71p is positioned between the second film center 71r of the second film surface 71q and the plane 75 including the outer edge of the film portion 71.

Figure 11E:
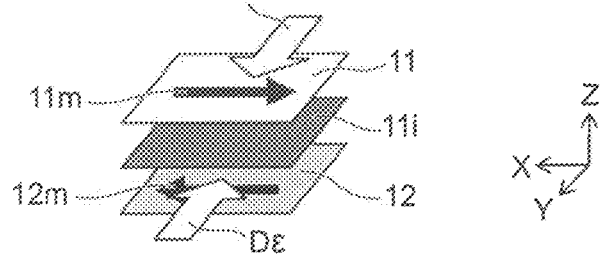

FIG. 11E is a schematic view illustrating the magnetization directions of the magnetic layers of the first sensor portion 51 and the direction of the stress (the strain) applied to the first sensor portion 51. In the example, the first magnetic layer 11 is a free layer; and the second magnetic layer 12 is a reference layer. For example, the second magnetization 12m of the second magnetic layer 12 is fixed in a direction along the X-axis direction. For example, the first magnetization 11m of the first magnetic layer 11 is aligned with the X-axis direction in the first state. In the first state, the first magnetization 11m is in the reverse direction of the second magnetization 12m. In the sensor 114, the magnetostriction constant (λs) of the first magnetic layer 11 is negative.

As shown in FIG. 11E, the stress (the strain) is applied in the direction Dε in the first sensor portion 51. The direction Dε is a direction along the Y-axis direction. Strain in a direction perpendicular to the direction of the magnetization of the reference layer is generated in the first sensor portion 51. In such a case, a negative initial strain bias is applied in the first sensor portion 51. As shown in FIG. 11D, the first sensor portion 51 (the first conductive layer 21) has a downward convex shape.

Figure 12A:
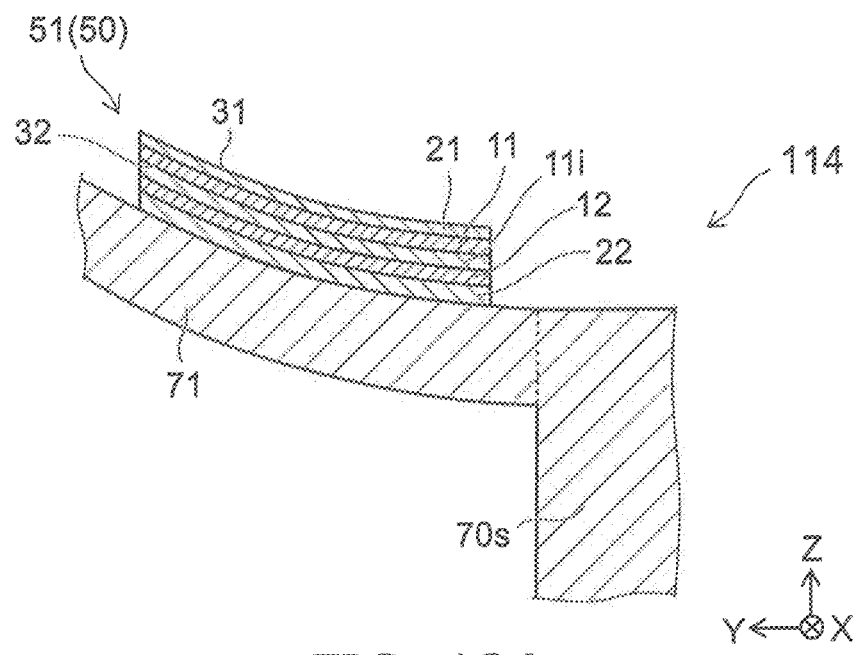
FIG. 12A and FIG. 12B are schematic cross-sectional views illustrating a portion of the sensor according to the second embodiment.
Figure 12B:
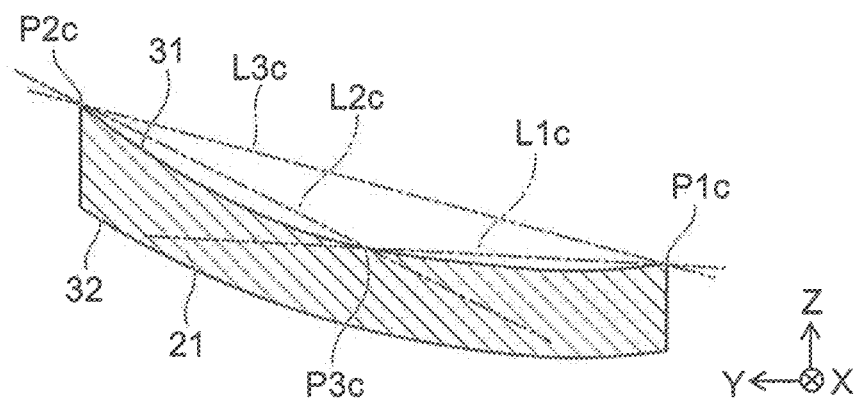

FIG. 12A and FIG. 12B are schematic cross-sectional views illustrating a portion of the sensor according to the second embodiment.

FIG. 12A shows a cross section of the sensor 114 along line C5-C6 shown in FIG. 11B. FIG. 12B shows the enlarged first conductive layer 21 shown in FIG. 11A. As shown in FIG. 12B, the first conductive layer 21 and the first conductive layer surface 31 have downward convex shapes.

As shown in FIG. 12B, the first conductive layer surface 31 includes first to third points P1c to P3c. The third point P3c is positioned between the first point P1c and the second point P2c on the first conductive layer surface 31. The first to third points P1c to P3c are positioned in the Y-Z plane. For example, the first point P1c and the second point P2c are positioned at the ends of the first conductive layer surface 31; and the third point P3c is positioned at the center of the first conductive layer surface 31. A first straight line L1c that connects the first point P1c and the third point P3c is tilted with respect to a second straight line L2c connecting the second point P2c and the third point P3c. The third point P3c is positioned between the film portion 71 and a third straight line L3c connecting the first point P1c and the second point P2c.

Thus, the first conductive layer 21 is curved. An appropriate initial strain bias is applied to the first sensor portion 51. The sensitivity of the first sensor portion 51 can be high. In the sensor 114, the film portion 71 is flat or upwardly convex in the first state. In the example, the film portion 71 may be downwardly convex in the first state.

FIG. 13A to FIG. 13E are schematic views illustrating a sensor according to the second embodiment.

Figure 13A:
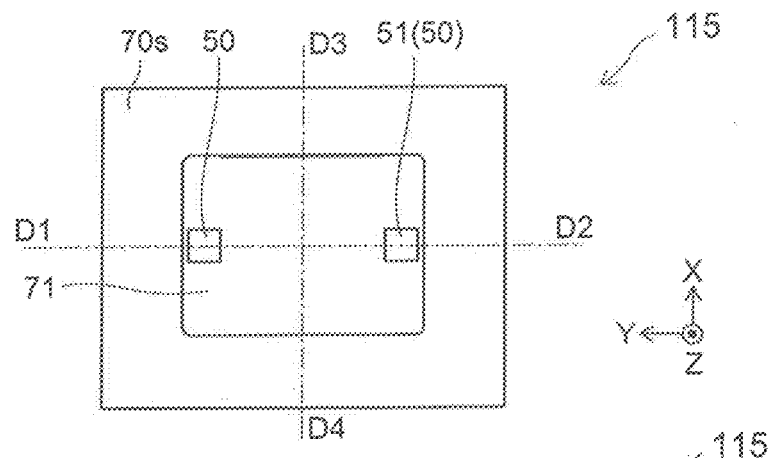
FIG. 13A to FIG. 13E are schematic views illustrating a sensor according to the second embodiment.

FIG. 13A is a schematic plan view illustrating the sensor 115 according to the embodiment.

Figure 13B:
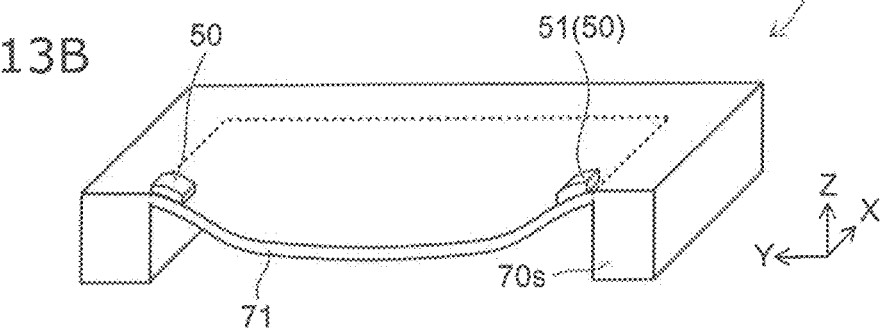

FIG. 13B is a schematic perspective view illustrating a cross section of the sensor 115 along line D1-D2 shown in FIG. 13A.

Figure 13C:

FIG. 13C is a schematic cross-sectional view along line D1-D2 of the film portion 71 and the sensor portion 50 (the first sensor portion 51).

Figure 13D:
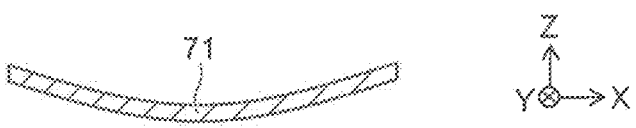

FIG. 13D is a schematic cross-sectional view of the film portion 71 along line D3-D4 shown in FIG. 13A.

FIG. 13A to FIG. 13D illustrate the sensor 115 in the first state. As shown in FIG. 13B to FIG. 13D, the film portion 71 has a downward convex shape in the first state.

Figure 13E:
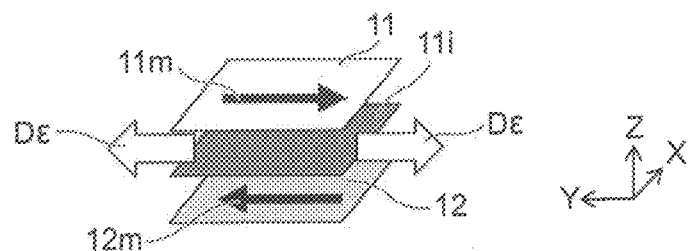

FIG. 13E is a schematic view illustrating the magnetization directions of the magnetic layers of the first sensor portion 51 and the direction of the stress (the strain) applied to the first sensor portion 51. In the example, the first magnetic layer 11 is a free layer; and the second magnetic layer 12 is a reference layer. For example, the second magnetization 12m of the second magnetic layer 12 is fixed in a direction along the Y-axis direction. For example, the first magnetization 11m of the first magnetic layer 11 is aligned with the Y-axis direction in the first state. The first magnetization 11m is in the reverse direction of the second magnetization 12m in the first state. In the sensor 115, the magnetostriction constant ($\lambda$s) of the first magnetic layer 11 is negative.

As shown in FIG. 11E, stress (strain) is applied in the direction Dc in the first sensor portion 51. The direction Dc is a direction along the Y-axis direction. Strain in a direction parallel to the pinning direction of the reference layer is generated in the first sensor portion 51. In such a case, a positive initial strain bias is applied to the first sensor portion 51. In the example as shown in FIG. 13C, the first sensor portion 51 (the first conductive layer 21 and the first conductive layer surface 31) has an upward convex shape.

An appropriate initial strain bias is applied to the first sensor portion 51. The sensitivity of the first sensor portion 51 can be high. In the example, the film portion 71 is flat or downwardly convex in the first state. In the example, the film portion 71 may be upwardly convex in the first state.

FIG. 14A to FIG. 14E are schematic views illustrating a sensor according to the second embodiment.

Figure 14A:
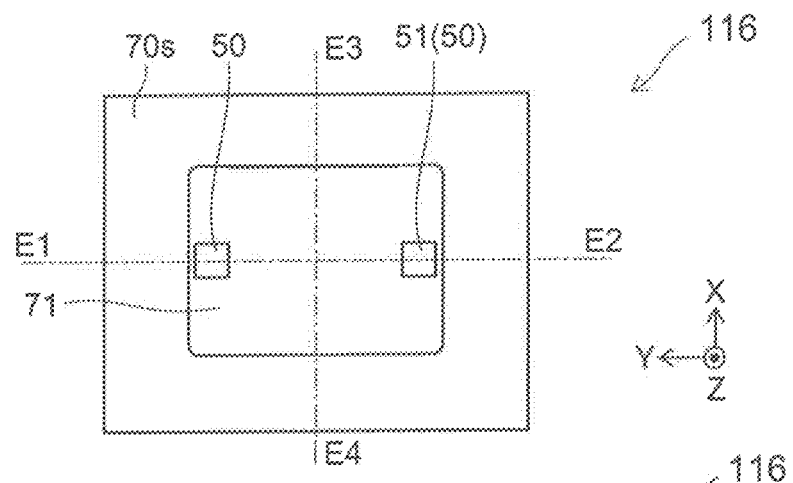
FIG. 14A to FIG. 14E are schematic views illustrating a sensor according to the second embodiment.

FIG. 14A is a schematic plan view illustrating the sensor 116 according to the embodiment.

Figure 14B:
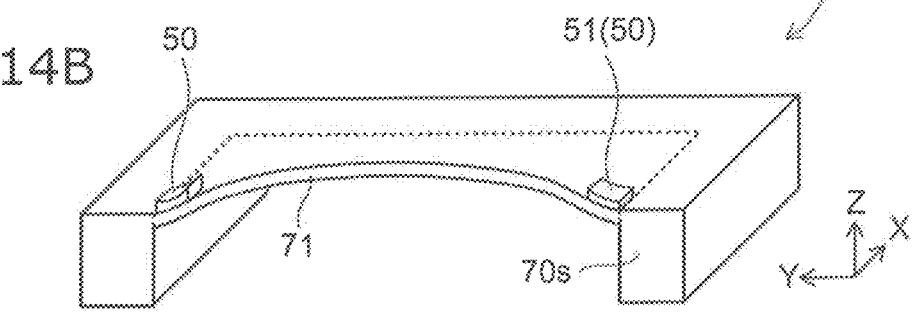

FIG. 14B is a schematic perspective view illustrating a cross section of the sensor 116 along line E1-E2 shown in FIG. 14A.

Figure 14C:
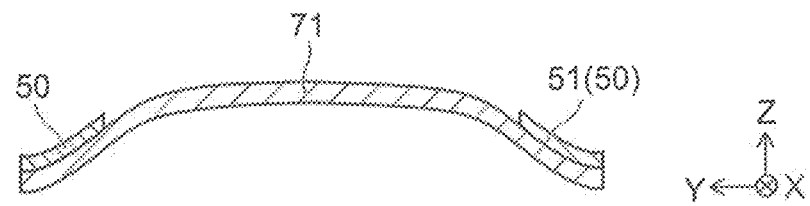

FIG. 14C is a schematic cross-sectional view along line E1-E2 of the film portion 71 and the sensor portion 50 (the first sensor portion 51).

Figure 14D:

FIG. 14D is a schematic cross-sectional view of the film portion 71 along line E3-E4 shown in FIG. 14A.

FIG. 14A to FIG. 14D illustrate the sensor 116 in the first state. As shown in FIG. 14B to FIG. 14D, the film portion 71 has an upward convex shape in the first state.

Figure 14E:
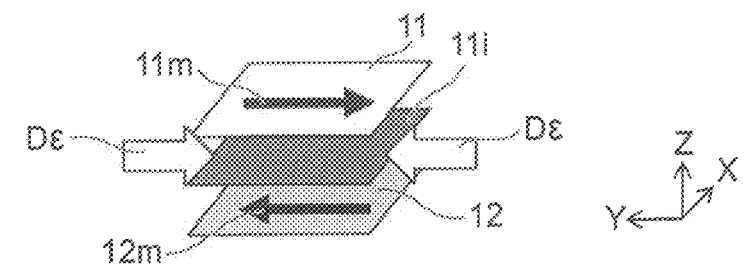

FIG. 14E is a schematic view illustrating the magnetization directions of the magnetic layers of the first sensor portion 51 and the direction of the stress (the strain) applied to the first sensor portion 51. In the example, the first magnetic layer 11 is a free layer; and the second magnetic layer 12 is a reference layer. For example, the second magnetization 12m of the second magnetic layer 12 is fixed in a direction along the Y-axis direction. For example, the first magnetization 11m of the first magnetic layer 11 is aligned with the Y-axis direction in the first state. The first magnetization 11m is in the reverse direction of the direction of the second magnetization 12m in the first state. In the sensor 116, the magnetostriction constant ($\lambda$s) of the first magnetic layer 11 is positive.

As shown in FIG. 14E, stress (strain) in the direction D$\epsilon$ is applied in the first sensor portion 51. The direction D$\epsilon$ is a direction along the Y-axis direction. Strain in a direction parallel to the pinning direction of the reference layer is generated in the first sensor portion 51. In such a case, a negative initial strain bias is applied to the first sensor portion 51. In the example as shown in FIG. 14C, the first sensor portion 51 (the first conductive layer 21 and the first conductive layer surface 31) has a downward convex shape.

An appropriate initial strain bias is applied to the first sensor portion 51. The sensitivity of the first sensor portion 51 can be high. In the example, the film portion 71 is flat or upwardly convex in the first state. In the example, the film portion 71 may be downwardly convex in the first state.

Third Embodiment

Figure 15A:
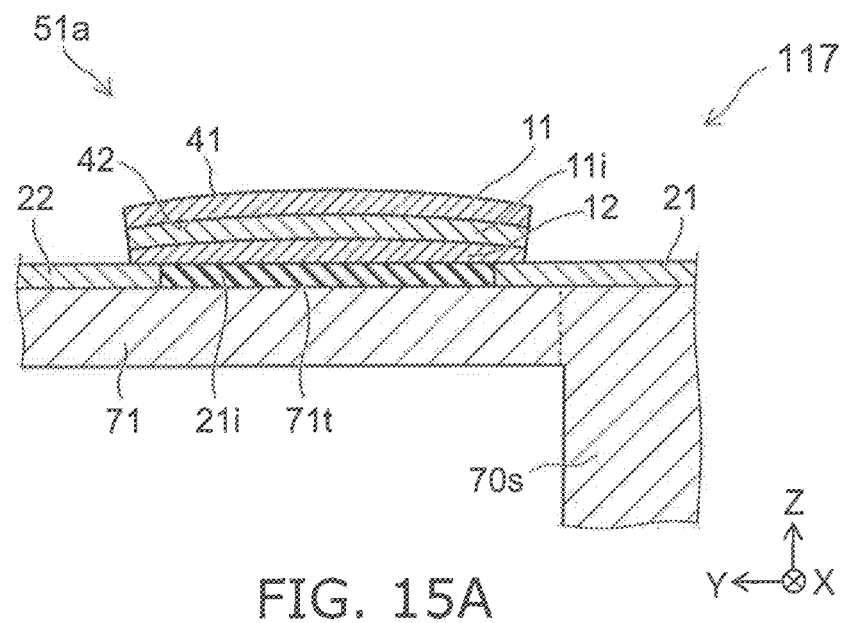
FIG. 15A and FIG. 15B are schematic cross-sectional views illustrating a sensor according to a third embodiment.
Figure 15B:
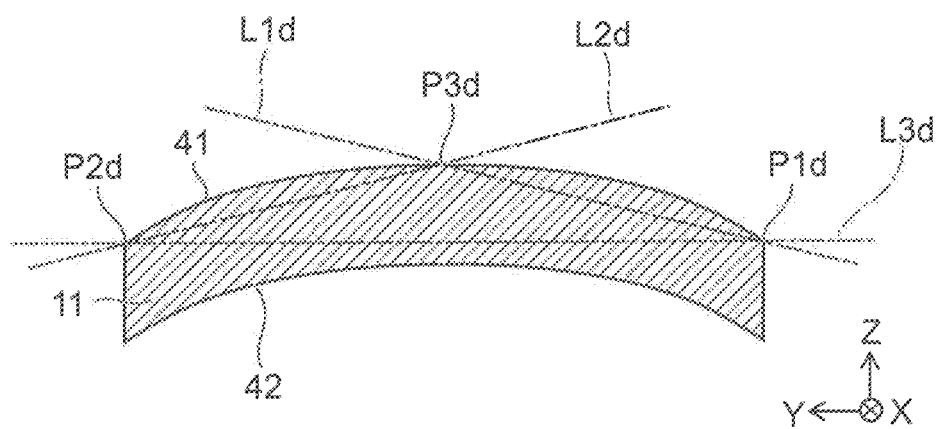

FIG. 15A and FIG. 15B are schematic cross-sectional views illustrating a sensor according to a third embodiment.

The sensor 117 according to the embodiment includes a first sensor portion 51a instead of the first sensor portion 51 described above. FIG. 15A illustrates a portion of the support portion 70s, a portion of the film portion 71, and the first sensor portion 51. The first sensor portion 51a is provided on the film portion 71. The first sensor portion 51a includes the first magnetic layer 11, the second magnetic layer 12, and the first intermediate layer 11i. The second magnetic layer 12 is provided between the first magnetic layer 11 and the film portion 71.

In the first sensor portion 51a, the positions of the first conductive layer 21 and the second conductive layer 22 are different from those of the case of the first sensor 51. Otherwise, a description similar to that of the first sensor portion 51 is applicable to the first sensor portion 51a. In the example, the first conductive layer 21 is connected to one region of the second magnetic layer 12. The second conductive layer 22 is connected to one other region of the second magnetic layer 12. The one other region of the second magnetic layer 12 described above is arranged with the one region of the second magnetic layer 12 described above in a direction crossing the Z-axis direction. In the first sensor portion 51a, the current flows along the layer surface of the magnetic layer. The first sensor portion 51a is a CIP-type. In the first sensor portion 51a, an insulating layer 21i is provided between the second magnetic layer 12 and the film portion 71 and between the first conductive layer 21 and the second conductive layer 22.

Otherwise, a description similar to that of the sensor 110 described above is applicable to the sensor 117.

In the first sensor portion 51a, the first conductive layer 21 may be connected to one region of the first intermediate layer 11i; and the second conductive layer 22 may be connected to one other region of the first intermediate layer 11i. The other region of the first intermediate layer 11i described above is arranged with the one region of the first intermediate layer 11i described above in a direction crossing the Z-axis direction. In such a case as well, the current flows along the layer surface of the magnetic layer.

In the first sensor portion 51a, the first conductive layer 21 may be connected to one region of the first magnetic layer 11; and the second conductive layer 22 may be connected to one other region of the first magnetic layer 11. The other region of the first magnetic layer 11 described above is arranged with the one region of the first magnetic layer 11 described above in a direction crossing the Z-axis direction. In such a case as well, the current flows along the layer surface of the magnetic layer.

As shown in FIG. 15A, the curvature of the first magnetic layer 11 is different from the curvature of at least a portion of the film portion 71. For example, the curvature (the absolute value of the curvature) of the first magnetic layer 11 is higher than the curvature (the absolute value of the curvature) of at least a portion of the film portion 71. FIG. 15B shows the enlarged first magnetic layer 11 shown in FIG. 15A. As shown in FIG. 15B, for example, the first magnetic layer 11 is curved in the first state (the initial state) in which the external pressure is not applied to the first sensor portion 51a. The first magnetic layer 11 has a first magnetic layer surface 41 and a second magnetic layer surface 42. The second magnetic layer surface 42 is positioned between the first magnetic layer surface 41 and the film portion 71. For example, the first magnetic layer surface 41 is curved in the first state. The curvature (the absolute value of the curvature) of the first magnetic layer 11 may be lower than the curvature (the absolute value of the curvature) of at least a portion of the film portion 71.

The first magnetic layer surface 41 includes first to third points P1d to P3d. The third point P3d is positioned between the first point P1d and the second point P2d on the first magnetic layer surface 41. The first to third points P1d to P3d are positioned in the Y-Z plane. For example, the first point P1d and the second point P2d are positioned at the ends of the first magnetic layer surface 41; and the third point P3d is positioned at the center of the first magnetic layer surface 41. A first straight line L1d that connects the first point P1d and the third point P3d is tilted with respect to a second straight line L2d connecting the second point P2d and the third point P3d.

In the example, the first magnetic layer 11 has an upward convex shape in the first state. A third straight line L3d that connects the first point P1d and the second point P2d is positioned between the film portion 71 and the third point P3d.

In the example, the first magnetic layer 11 may have a downward convex shape in the first state. The third point P3d may be positioned between the film portion 71 and the third straight line L3d connecting the first point P1d and the second point P2d. The intermediate layer 11i and the second magnetic layer 12 may be curved similarly to the first magnetic layer 11. It is desirable for the curvature of the first magnetic layer surface 41 to be, for example, greater than 0 $(mm^{-1})$ and not more than 2.0 $(mm^{-1})$, e.g., not less than 0.1 $(mm^{-1})$ and not more than 2.0 $(mm^{-1})$.

In the example shown in FIG. 15A, the film portion 71 is flat in the first state. In the example, the film portion 71 may be upwardly convex or downwardly convex in the first state.

As shown in FIG. 15A, the film portion 71 includes the film portion region 71t where the first sensor portion 51a is provided. For example, the film portion region 71t is the region of the surface of the film portion 71 contacting the first sensor portion 51a. For example, the curvature of the first magnetic layer surface 41 is different from the curvature of the film portion region 71t. For example, the sign (positive or negative) of the curvature of the film portion region 71t may be the same as the sign of the curvature of the first magnetic layer surface 41. For example, the curvature (the absolute value of the curvature) of the film portion region 71t is lower than the curvature (the absolute value of the curvature) of the first magnetic layer surface 41. The curvature of the film portion region 71t may be zero. The sign of the curvature of the film portion region 71t may be the reverse of the sign of the curvature of the first magnetic layer surface 41.

In the fourth embodiment as well, the first magnetic layer 11 is curved in the first state in which the external pressure is not applied to the first sensor portion 51a. An initial strain bias is applied to the first sensor portion 51a. The first sensor portion 51a can be operated in an operation region having high sensitivity for the external pressure. According to the embodiment, a sensor can be provided in which the sensitivity can be increased.

Fourth Embodiment

Figure 16A:
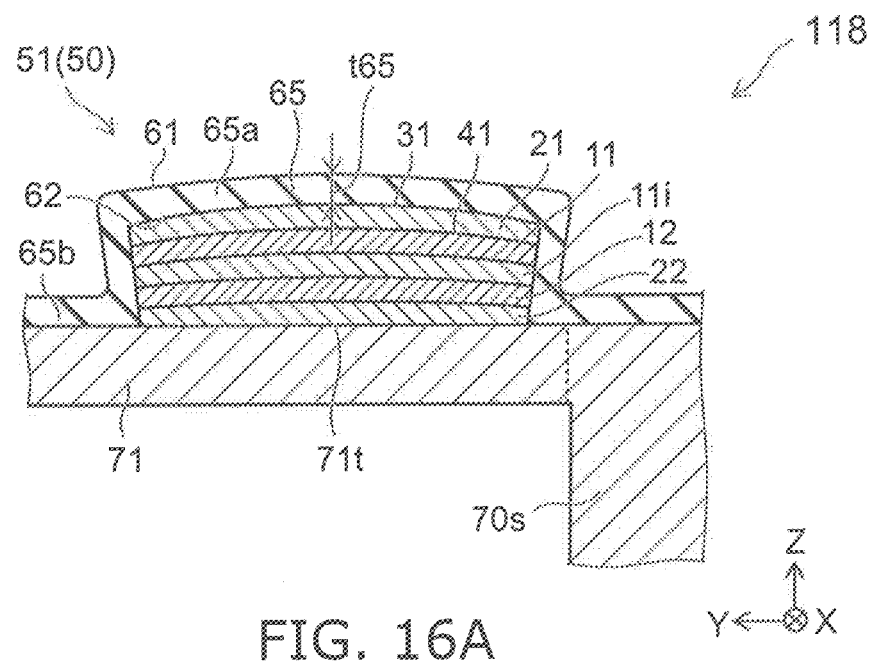
FIG. 16A and FIG. 16B are schematic cross-sectional views illustrating a sensor according to a fourth embodiment.
Figure 16B:
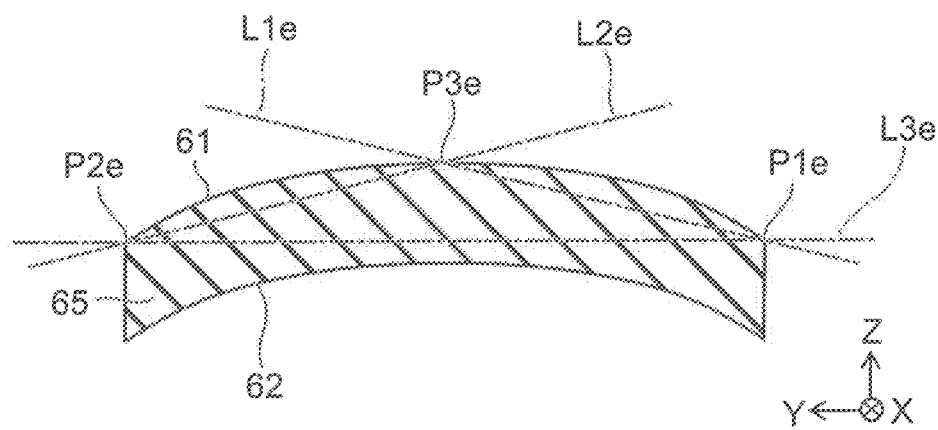

FIG. 16A and FIG. 16B are schematic cross-sectional views illustrating a sensor according to a fourth embodiment.

The sensor 118 according to the embodiment includes an insulating film 65. Otherwise, a description similar to that of the sensor 110 described above is applicable to the sensor 118.

As shown in FIG. 16A, the first magnetic layer 11 is provided between the film portion 71 and at least a portion of the insulating film 65. For example, the first magnetic layer 11 is provided between the film portion 71 and one region 65a of the insulating film 65. For example, one other region 65b of the insulating film 65 contacts the film portion 71. For example, the insulating film 65 is a passivation film covering the first sensor portion 51. The insulating film 65 includes, for example, silicon oxide ($SiO_2$).

The insulating film 65 has a first insulating film surface 61 and a second insulating film surface 62. The second insulating film surface 62 is positioned between the first insulating film surface 61 and the first magnetic layer 11. The insulating film 65 contacts the upper surface (e.g., the first conductive layer surface 31 or the first magnetic layer surface 41) of the first sensor portion 51 at the second insulating film surface 62. The first insulating film surface 61 is a region of the front surface of the insulating film 65 distal to the second insulating film surface 62 in the Z-axis direction.

A thickness t65 (the length along the Z-axis direction) of the region 65a of the insulating film 65 is, for example, not less than 5 nm and not more than 200 nm. The thickness t65 may be 100 nm or less.

As shown in FIG. 16A, the curvature of the insulating film 65 is different from the curvature of at least a portion of the film portion 71. For example, the curvature (the absolute value of the curvature) of the insulating film 65 is higher than the curvature (the absolute value of the curvature) of at least a portion of the film portion 71. FIG. 16B shows the enlarged insulating film 65 shown in FIG. 16A. As shown in FIG. 16B, for example, the first insulating film surface 61 is curved in the first state in which the external pressure is not applied to the first sensor portion 51. The curvature (the absolute value of the curvature) of the insulating film 65 may be lower than the curvature (the absolute value of the curvature) of at least a portion of the film portion 71.

The first insulating film surface 61 includes first to third points P1e to P3e. The third point P3e is positioned between the first point P1e and the second point P2e on the first insulating film surface 61. The first to third points P1e to P3e are positioned in the Y-Z plane. For example, the first point P1e and the second point P2e are positioned at the ends of the first insulating film surface 61; and the third point P3e is positioned at the center of the first insulating film surface 61. A first straight line L1e that connects the first point P1e and the third point P3e is tilted with respect to a second straight line L2e connecting the second point P2e and the third point P3e.

In the example, the first insulating film surface 61 has an upward convex shape in the first state. A third straight line L3e that connects the first point P1e and the second point P2e is positioned between the film portion 71 and the third point P3e.

In the example, the first insulating film surface 61 may have a downward convex shape in the first state. The third point P3e may be positioned between the film portion 71 and the third straight line L3e connecting the first point P1e and the second point P2e. The first conductive layer 21, the first magnetic layer 11, the intermediate layer 11i, the second magnetic layer 12, and the second conductive layer 22 may be curved similarly to the first insulating film surface 61. It is desirable for the curvature of the first insulating film surface 61 to be, for example, greater than 0 (mm$^{-1}$) and not more than 2.0 (mm$^{-1}$), e.g., not less than 0.1 (mm$^{-1}$) and not more than 2.0 (mm$^{-1}$).

In FIG. 16A, the film portion 71 is flat in the first state. In the example, similarly to the case of the sensors 113 to 116, the film portion 71 may be upwardly convex or downwardly convex in the first state.

As shown in FIG. 16A, the film portion 71 includes the film portion region 71t where the first sensor portion 51 is provided. For example, the film portion region 71t is the region of the surface of the film portion 71 contacting the first sensor portion 51. For example, the curvature of the first insulating film surface 61 is different from the curvature of the film portion region 71t. For example, the sign (positive or negative) of the curvature of the film portion region 71t may be the same as the sign of the curvature of the first insulating film surface 61. For example, the curvature (the absolute value of the curvature) of the film portion region 71t is lower than the curvature (the absolute value of the curvature) of the first insulating film surface 61. The curvature of the film portion region 71t may be zero. The sign of the curvature of the film portion region 71t may be the reverse of the sign of the curvature of the first insulating film surface 61.

In the embodiment as described above, the first insulating film surface 61 is curved in the first state in which the external pressure is not applied to the first sensor portion 51. An initial strain bias is applied to the first sensor portion 51. The first sensor portion 51 can be operated in an operation region having high sensitivity for the external pressure. According to the embodiment, a sensor can be provided in which the sensitivity can be increased.

Examples of the sensor portions included in the embodiments will now be described. In the following description, the notation "material A/material B" indicates a state in which a layer of material B is provided on a layer of material A.

Figure 17:
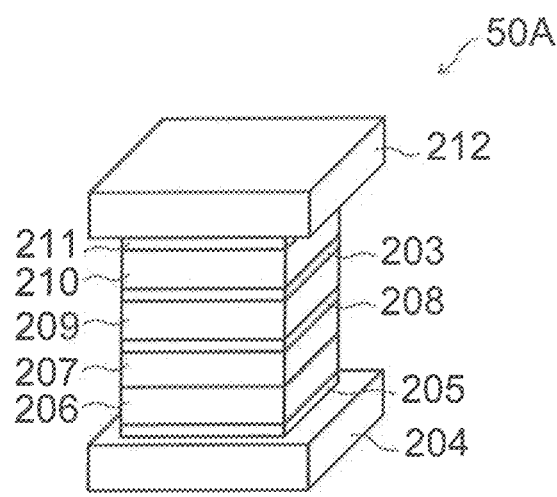
FIG. 17 is a schematic perspective view illustrating a portion of the sensor according to the embodiment.

FIG. 17 is a schematic perspective view illustrating a portion of the sensor according to the embodiment.

In a sensor portion 50A as shown in FIG. 17, a lower electrode 204, a foundation layer 205, a pinning layer 206, a second magnetization reference layer 207, a magnetic coupling layer 208, a first magnetization reference layer 209, an intermediate layer 203, a free magnetic layer 210, a capping layer 211, and an upper electrode 212 are arranged in this order. For example, the sensor portion 50A is a bottom spin-valve type. The magnetization reference layer is, for example, a fixed magnetic layer.

The foundation layer 205 includes, for example, a stacked film of tantalum and ruthenium (Ta/Ru). The thickness (the length in the Z-axis direction) of the Ta layer is, for example, 3 nanometers (nm). The thickness of the Ru layer is, for example, 2 nm. The pinning layer 206 includes, for example, an IrMn-layer having a thickness of 7 nm. The second magnetization reference layer 207 includes, for example, a $Co_{75}Fe_{25}$ layer having a thickness of 2.5 nm. The magnetic coupling layer 208 includes, for example, a Ru layer having a thickness of 0.9 nm. The first magnetization reference layer 209 includes, for example, a $Co_{40}Fe_{40}B_{20}$ layer having a thickness of 3 nm. The intermediate layer 203 includes, for example, a MgO layer having a thickness of 1.6 nm. The free magnetic layer 210 includes, for example, $Co_{40}Fe_{40}B_{20}$ having a thickness of 4 nm. The capping layer 211 includes, for example, Ta/Ru. The thickness of the Ta layer is, for example, 1 nm. The thickness of the Ru layer is, for example, 5 nm.

The lower electrode 204 and the upper electrode 212 include, for example, at least one of aluminum (Al), an aluminum copper alloy (Al—Cu), copper (Cu), silver (Ag), or gold (Au). By using such a material having a relatively small electrical resistance as the lower electrode 204 and the upper electrode 212, the current can be caused to flow efficiently in the sensor portion 50A. The lower electrode 204 and the upper electrode 212 include nonmagnetic materials.

The lower electrode 204 and the upper electrode 212 may include, for example, a foundation layer (not illustrated) for the lower electrode 204 and the upper electrode 212, a capping layer (not illustrated) for the lower electrode 204 and the upper electrode 212, and a layer of at least one of Al, Al—Cu, Cu, Ag, or Au provided between the foundation layer and the capping layer. For example, the lower electrode 204 and the upper electrode 212 include tantalum (Ta)/copper (Cu)/tantalum (Ta), etc. For example, by using Ta as the foundation layer of the lower electrode 204 and the upper electrode 212, the adhesion between the substrate (e.g., a film) and the lower electrode 204 and between the substrate and the upper electrode 212 improves. Titanium (TI), titanium nitride (TIN), etc., may be used as the foundation layer for the lower electrode 204 and the upper electrode 212.

By using Ta as the capping layer of the lower electrode 204 and the upper electrode 212, the oxidization of the copper (Cu), etc., under the capping layer is suppressed. Titanium (Ti), titanium nitride (TiN), etc., may be used as the capping layer for the lower electrode 204 and the upper electrode 212.

The foundation layer 205 includes, for example, a stacked structure including a buffer layer (not illustrated) and a seed layer (not illustrated). For example, the buffer layer relaxes the roughness of the surfaces of the lower electrode 204, the film, etc., and improves the crystallinity of the layers stacked on the buffer layer. For example, at least one selected from the group consisting of tantalum (Ta), titanium (Ti), vanadium (V), tungsten (W), zirconium (Zr), hafnium (Hf), and chrome (Cr) is used as the buffer layer. An alloy that includes at least one material selected from these materials may be used as the buffer layer.

It is favorable for the thickness of the buffer layer of the foundation layer 205 to be not less than 1 nm and not more than 10 nm. It is more favorable for the thickness of the buffer layer to be not less than 1 nm and not more than 5 nm. In the case where the thickness of the buffer layer is too thin, the buffering effect is lost. In the case where the thickness of the buffer layer is too thick, the thickness of the sensor portion 50A becomes excessively thick. The seed layer is formed on the buffer layer; and, for example, the seed layer has a buffering effect. In such a case, the buffer layer may be omitted. The buffer layer includes, for example, a Ta layer having a thickness of 3 nm.

The seed layer of the foundation layer 205 controls the crystal orientation of the layers stacked on the seed layer. The seed layer controls the crystal grain size of the layers stacked on the seed layer. As the seed layer, a metal having a fcc structure (face-centered cubic structure), a hcp structure (hexagonal close-packed structure), a bcc structure (body-centered cubic structure), or the like is used.

For example, the crystal orientation of the spin-valve film on the seed layer can be set to the fcc (111) orientation by using, as the seed layer of the foundation layer 205, ruthenium (Ru) having a hcp structure, NiFe having a fcc structure, or Cu having a fcc structure. The seed layer includes, for example, a Cu layer having a thickness of 2 nm or a Ru layer having a thickness of 2 nm. To increase the crystal orientation of the layers formed on the seed layer, it is favorable for the thickness of the seed layer to be not less than 1 nm and not more than 5 nm. It is more favorable for the thickness of the seed layer to be not less than 1 nm and not more than 3 nm. Thereby, the function as a seed layer that improves the crystal orientation is realized sufficiently.

On the other hand, for example, the seed layer may be omitted in the case where it is unnecessary for the layers formed on the seed layer to have a crystal orientation (e.g., in the case where an amorphous free magnetic layer is formed, etc.). For example, a Cu layer having a thickness of 2 nm is used as the seed layer.

For example, the pinning layer 206 provides unidirectional anisotropy to the second magnetization reference layer 207 (the ferromagnetic layer) formed on the pinning layer 206 and fixes the magnetization of the second magnetization reference layer 207. The pinning layer 206 includes, for example, an antiferromagnetic layer. The pinning layer 206 includes, for example, at least one selected from the group consisting of Ir—Mn, Pt—Mn, Pd—Pt—Mn, Ru—Mn, Rh—Mn, Ru—Rh—Mn, Fe—Mn, Ni—Mn, Cr—Mn—Pt, and Ni—O. An alloy may be used in which an added element is further added to the at least one selected from the group consisting of Ir—Mn, Pt—Mn, Pd—Pt—Mn, Ru—Mn, Rh—Mn, Ru—Rh—Mn, Fe—Mn, Ni—Mn, Cr—Mn—Pt, and Ni—O. The thickness of the pinning layer 206 is set appropriately. Thereby, for example, the unidirectional anisotropy of the sufficient strength is provided.

For example, heat treatment is performed while applying a magnetic field. Thereby, for example, the magnetization of the ferromagnetic layer contacting the pinning layer 206 is fixed. The magnetization of the ferromagnetic layer contacting the pinning layer 206 is fixed in the direction of the magnetic field applied in the heat treatment. For example, the heat treatment temperature (the annealing temperature) is not less than the magnetization pinning temperature of the antiferromagnetic material included in the pinning layer 206. In the case where an antiferromagnetic layer including Mn is used, there are cases where the MR ratio decreases due to the Mn diffusing into layers other than the pinning layer 206. It is desirable for the heat treatment temperature to be set to be not more than the temperature at which the diffusion of Mn occurs. The heat treatment temperature is, for example, not less than 200° C. and not more than 500° C. Favorably, the heat treatment temperature is, for example, not less than 250° C. and not more than 400° C.

In the case where PtMn or PdPtMn is used as the pinning layer 206, it is favorable for the thickness of the pinning layer 206 to be not less than 8 nm and not more than 20 nm. It is more favorable for the thickness of the pinning layer 206 to be not less than 10 nm and not more than 15 nm. In the case where IrMn is used as the pinning layer 206, unidirectional anisotropy can be provided using a thickness that is thinner than the case where PtMn is used as the pinning layer 206. In such a case, it is favorable for the thickness of the pinning layer 206 to be not less than 4 nm and not more than 18 nm. It is more favorable for the thickness of the pinning layer 206 to be not less than 5 nm and not more than 15 nm. The pinning layer 206 includes, for example, an $Ir_{22}Mn_{78}$ layer having a thickness of 7 nm.

A hard magnetic layer may be used as the pinning layer 206. For example, Co—Pt, Fe—Pt, Co—Pd, Fe—Pd, etc., may be used as the hard magnetic layer. For example, the magnetic anisotropy and the coercivity are relatively high for these materials. These materials are hard magnetic materials. An alloy in which an added element is further added to Co—Pt, Fe—Pt, Co—Pd, or Fe—Pd may be used as the pinning layer 206. For example, CoPt (the proportion of Co being not less than 50 at. % and not more than 85 at. %), $(Co_xPt_{100-x})_{100-y}Cr_y$ (x being not less than 50 at. % and not more than 85 at. %, and y being not less than 0 at. % and not more than 40 at. %), FePt (the proportion of Pt being not less than 40 at. % and not more than 60 at. %), etc., may be used.

The second magnetization reference layer 207 includes, for example, a $Co_xFe_{100-x}$ alloy (x being not less than 0 at. % and not more than 100 at. %) or a $Ni_xFe_{100-x}$ alloy (x being not less than 0 at. % and not more than 100 at. %). These materials may include a material to which a nonmagnetic element is added. For example, at least one selected from the group consisting of Co, Fe, and Ni is used as the second magnetization reference layer 207. An alloy that includes at least one material selected from these materials may be used as the second magnetization reference layer 207. Also, a $(Co_xFe_{100-x})_{100-y}B_y$ alloy (x being not less than 0 at. % and not more than 100 at. %, and y being not less than 0 at. % and not more than 30 at. %) may be used as the second magnetization reference layer 207. By using an amorphous alloy of $(Co_xFe_{100-x})_{100-y}B_y$ as the second magnetization reference layer 207, the fluctuation of the characteristics of the sensor portion 50A can be suppressed even in the case where the sizes of the sensor portions are small.

For example, it is favorable for the thickness of the second magnetization reference layer 207 to be not less than 1.5 nm and not more than 5 nm. Thereby, for example, the strength of the unidirectional anisotropic magnetic field due to the pinning layer 206 can be stronger. For example, the strength of the antiferromagnetic coupling magnetic field between the second magnetization reference layer 207 and the first magnetization reference layer 209 via the magnetic coupling layer formed on the second magnetization reference layer 207 can be stronger. For example, it is favorable for the magnetic thickness (the product of the saturation magnetization and the thickness) of the second magnetization reference layer 207 to be substantially equal to the magnetic thickness of the first magnetization reference layer 209.

The saturation magnetization of the thin film of $Co_{40}Fe_{40}B_{20}$ is about 1.9 T (teslas). For example, in the case where a $Co_{40}Fe_{40}B_{20}$ layer having a thickness of 3 nm is used as the first magnetization reference layer 209, the magnetic thickness of the first magnetization reference layer 209 is 1.9 T×3 nm, i.e., 5.7 Tnm. On the other hand, the saturation magnetization of $Co_{75}Fe_{25}$ is about 2.1 T. The thickness of the second magnetization reference layer 207 to obtain a magnetic thickness equal to that described above is 5.7 Tnm/2.1 T, i.e., 2.7 nm. In such a case, it is favorable for a $Co_{75}Fe_{25}$ layer having a thickness of about 2.7 nm to be included in the second magnetization reference layer 207. For example, a $Co_{75}Fe_{25}$ layer having a thickness of 2.5 nm is used as the second magnetization reference layer 207.

In the sensor portion 50A, a synthetic pinned structure made of the second magnetization reference layer 207, the magnetic coupling layer 208, and the first magnetization reference layer 209 is used. A single pinned structure made of one magnetization reference layer may be used instead. In the case where the single pinned structure is used, for example, a $Co_{40}Fe_{40}B_{20}$ layer having a thickness of 3 nm is used as the magnetization reference layer. The same material as the second magnetization reference layer 207 described above may be used as the ferromagnetic layer included in the magnetization reference layer having the single pinned structure.

The magnetic coupling layer 208 causes antiferromagnetic coupling to occur between the second magnetization reference layer 207 and the first magnetization reference layer 209. The magnetic coupling layer 208 has a synthetic pinned structure. For example, Ru is used as the material of the magnetic coupling layer 208. For example, it is favorable for the thickness of the magnetic coupling layer 208 to be not less than 0.8 nm and not more than 1 nm. A material other than Ru may be used as the magnetic coupling layer 208 if the material causes sufficient antiferromagnetic coupling to occur between the second magnetization reference layer 207 and the first magnetization reference layer 209. For example, the thickness of the magnetic coupling layer 208 is set to be a thickness not less than 0.8 nm and not more than 1 nm corresponding to the second peak (2nd peak) of RKKY (Ruderman-Kittel-Kasuya-Yosida) coupling. Further, the thickness of the magnetic coupling layer 208 may be set to be a thickness not less than 0.3 nm and not more than 0.6 nm corresponding to the first peak (1st peak) of RKKY coupling. For example, Ru having a thickness of 0.9 nm is used as the material of the magnetic coupling layer 208. Thereby, highly reliable coupling is obtained more stably.

The magnetic layer that is included in the first magnetization reference layer 209 contributes directly to the MR effect. For example, a Co—Fe—B alloy is used as the first magnetization reference layer 209. Specifically, a $(Co_xFe_{100-x})_{100-y}B_y$ alloy (x being not less than 0 at. % and not more than 100 at. %, and y being not less than 0 at. % and not more than 30 at. %) may be used as the first magnetization reference layer 209. For example, the fluctuation between the elements caused by crystal grains can be suppressed even in the case where the size of the sensor portion 50A is small by using a $(Co_xFe_{100-x})_{100-y}B_y$ amorphous alloy as the first magnetization reference layer 209.

The layer (e.g., a tunneling insulating layer (not illustrated)) that is formed on the first magnetization reference layer 209 may be planarized. The defect density of the tunneling insulating layer can be reduced by planarizing the tunneling insulating layer. Thereby, a higher MR ratio is obtained with a lower resistance per area. For example, in the case where MgO is used as the material of the tunneling insulating layer, the (100) orientation of the MgO layer that is formed on the tunneling insulating layer can be strengthened by using a $(Co_xFe_{100-x})_{100-y}B_y$ amorphous alloy as the first magnetization reference layer 209. A higher MR ratio is obtained by increasing the (100) orientation of the MgO layer. The $(Co_xFe_{100-x})_{100-y}B_y$ alloy crystallizes using the (100) plane of the MgO layer as a template when annealing. Therefore, good crystal conformation between the MgO and the $(Co_xFe_{100-x})_{100-y}B_y$ alloy is obtained. A higher MR ratio is obtained by obtaining good crystal conformation.

Other than the Co—Fe—B alloy, for example, an Fe—Co alloy may be used as the first magnetization reference layer 209.

A higher MR ratio is obtained as the thickness of the first magnetization reference layer 209 increases. For example, a larger fixed magnetic field is obtained as the thickness of the first magnetization reference layer 209 decreases. A trade-off relationship between the MR ratio and the fixed magnetic field exists for the thickness of the first magnetization reference layer 209. In the case where the Co—Fe—B alloy is used as the first magnetization reference layer 209, it is favorable for the thickness of the first magnetization reference layer 209 to be not less than 1.5 nm and not more than 5 nm. It is more favorable for the thickness of the first magnetization reference layer 209 to be not less than 2.0 nm and not more than 4 mm.

Other than the materials described above, the first magnetization reference layer 209 may include a $Co_{90}Fe_{10}$ alloy having a fcc structure, Co having a hcp structure, or a Co alloy having a hcp structure. For example, at least one selected from the group consisting of Co, Fe, and Ni is used as the first magnetization reference layer 209. An alloy that includes at least one material selected from these materials may be used as the first magnetization reference layer 209. For example, a higher MR ratio is obtained by using an FeCo alloy material having a bcc structure, a Co alloy having a cobalt composition of 50% or more, or a material (a Ni alloy) having a Ni composition of 50% or more as the first magnetization reference layer 209.

For example, a Heusler magnetic alloy layer such as $Co_2MnGe$, $Co_2FeGe$, $Co_2MnSi$, $Co_2FeSi$, $Co_2MnAl$, $Co_2FeAl$, $Co_2MnGa_{0.5}Ge_{0.5}$, $Co_2FeGa_{0.5}Ge_{0.5}$, etc., also may be used as the first magnetization reference layer 209.

For example, a $Co_{40}Fe_{40}B_{20}$ layer having a thickness of 3 nm may be used as the first magnetization reference layer 209.

For example, the intermediate layer 203 breaks the magnetic coupling between the first magnetization reference layer 209 and the free magnetic layer 210.

For example, the material of the intermediate layer 203 includes a metal, an insulator, or a semiconductor. For example, Cu, Au, Ag, or the like is used as the metal. In the case where a metal is used as the intermediate layer 203, the thickness of the intermediate layer is, for example, not less than about 1 nm and not more than about 7 nm. For example, magnesium oxide (MgO, etc.), aluminum oxide ($Al_2O_3$, etc.), titanium oxide (TIO, etc.), zinc oxide (ZnO, etc.), gallium oxide (Ga—O), or the like is used as the insulator or the semiconductor. In the case where the insulator or the semiconductor is used as the intermediate layer 203, the thickness of the intermediate layer 203 is, for example, not less than about 0.6 nm and not more than about 2.5 nm. For example, a CCP (Current-Confined-Path) spacer layer may be used as the intermediate layer 203. In the case where a CCP spacer layer is used as the spacer layer, for example, a structure is used in which a copper (Cu) metal path is formed inside an insulating layer of aluminum oxide ($Al_2O_3$). For example, a MgO layer having a thickness of 1.6 nm is used as the intermediate layer.

The free magnetic layer 210 includes a ferromagnet material. For example, the free magnetic layer 210 includes a ferromagnet material including Fe, Co, and Ni. For example, an FeCo alloy, a NiFe alloy, or the like is used as the material of the free magnetic layer 210. The free magnetic layer 210 may include a Co—Fe—B alloy, an Fe—Co—S—B alloy, an Fe—Ga alloy having a large λ (magnetostriction constant), an Fe—Co—Ga alloy, a Tb-M-Fe alloy, a Tb-M1-Fe-M2 alloy, an Fe-M3-M4-B alloy, Ni, Fe—Al, ferrite, etc. For example, the λ (magnetostriction constant) is large for these materials. In the Tb-M-Fe alloy described above, M is at least one selected from the group consisting of Sm, Eu, Gd, Dy, Ho, and Er. In the Tb-M1-Fe-M2 alloy described above, M1 is at least one selected from the group consisting of Sm, Eu, Gd, Dy, Ho, and Er. M2 is at least one selected from the group consisting of Ti, Cr, Mn, Co, Cu, Nb, Mo, W, and Ta. In the Fe-M3-M4-B alloy described above, M3 is at least one selected from the group consisting of Ti, Cr, Mn, Co, Cu, Nb, Mo, W, and Ta. M4 is at least one selected from the group consisting of Ce, Pr, Nd, Sm, Tb, Dy, and Er. $Fe_3O_4$, $(FeCo)_3O_4$, etc., are examples of the ferrite described above. The thickness of the free magnetic layer 210 is, for example, 2 nm or more.

The free magnetic layer 210 may include a magnetic material including boron. The free magnetic layer 210 may include, for example, an alloy including boron (B) and at least one element selected from the group consisting of Fe, Co, and Ni. For example, the free magnetic layer 210 includes a Co—Fe—B alloy or an Fe—B alloy. For example, a $Co_{40}Fe_{40}B_{20}$ alloy is used. Ga, Al, Si, W, etc., may be added in the case where the free magnetic layer 210 includes an alloy including boron (B) and at least one element selected from the group consisting of Fe, Co, and Ni. For example, high magnetostriction is promoted by adding these elements. For example, an Fe—Ga—B alloy, an Fe—Co—Ga—B alloy, or an Fe—Co—Si—B alloy may be used as the free magnetic layer 210. By using such a magnetic material containing boron, the coercivity (Hc) of the free magnetic layer 210 is low; and the change of the magnetization direction for the strain is easy. Thereby, high sensitivity is obtained.

It is favorable for the boron concentration (e.g., the composition ratio of boron) of the free magnetic layer 210 to be 5 at. % (the atomic percent) or more. Thereby, an amorphous structure is obtained easily. It is favorable for the boron concentration of the free magnetic layer to be 35 at. % or less. For example, the magnetostriction constant decreases when the boron concentration is too high. For example, it is favorable for the boron concentration of the free magnetic layer to be not less than 5 at. % and not more than 35 at. %; and it is more favorable to be not less than 10 at. % and not more than 30 at. %.

In the case where a portion of the magnetic layer of the free magnetic layer 210 includes $Fe_{1-y}B_y$ (0<y≤0.3) or $(Fe_zX_{1-z})_{1-y}B_y$ (X being Co or Ni, 0.8≤z<1, and 0<y≤0.3), it becomes easy to realize both a large magnetostriction constant k and a low coercivity. Therefore, this is particularly favorable from the perspective of obtaining a high gauge factor. For example, $Fe_{80}B_{20}$ (4 nm) is used as the free magnetic layer 210. $Co_{40}Fe_{40}B_{20}$ (0.5 nm)/$Fe_{80}B_{20}$ (4 nm) may be used as the free magnetic layer.

The free magnetic layer 210 may have a multilayered structure. In the case where a tunneling insulating layer of MgO is used as the intermediate layer 203, it is favorable to provide a layer of a Co—Fe—B alloy at the portion of the free magnetic layer 210 contacting the intermediate layer 203. Thereby, a high magnetoresistance effect is obtained. In such a case, a layer of a Co—Fe—B alloy is provided on the intermediate layer 203; and another magnetic material that has a large magnetostriction constant is provided on the layer of the Co—Fe—B alloy. In the case where the free magnetic layer 210 has the multilayered structure, for example, the free magnetic layer 210 may include Co—Fe—B (2 nm)/Fe—Co—Si—B (4 nm), etc.

The free magnetic layer 210 may include an alloy including $Co_xFe_{1-x}$ (70 at %≤x≤80 at %) having a crystal structure. The free magnetic layer 210 may have a multilayered structure including an alloy layer including $Co_xFe_{1-x}$ (70 at %≤x≤80 at %) having a crystal structure. The free magnetic layer 210 may include an alloy including $Ni_yFe_{1-y}$ (50 at %≤x≤75 at %) having a crystal structure. The free magnetic layer 210 may have a multilayered structure including an alloy layer including $Ni_yFe_{1-y}$ (50 at %≤y≤75 at %) having a crystal structure.

The capping layer 211 protects the layers provided under the capping layer 211. The capping layer 211 includes, for example, multiple metal layers. The capping layer 211 includes, for example, a two-layer structure (Ta/Ru) of a Ta layer and a Ru layer. The thickness of the Ta layer is, for example, 1 nm; and the thickness of the Ru layer is, for example, 5 nm. As the capping layer 211, another metal layer may be provided instead of the Ta layer and/or the Ru layer. The shape of the capping layer 211 is arbitrary. For example, a nonmagnetic material is used as the capping layer 211. Another material may be used as the capping layer 211 as long as the material can protect the layers provided under the capping layer 211.

In the case where the free magnetic layer 210 includes a magnetic material containing boron, a diffusion suppression layer (not illustrated) of an oxide material and/or a nitride material may be provided between the free magnetic layer 210 and the capping layer 211. Thereby, for example, the diffusion of boron is suppressed. By using the diffusion suppression layer including an oxide layer or a nitride layer, the diffusion of the boron included in the free magnetic layer 210 can be suppressed; and the amorphous structure of the free magnetic layer 210 can be maintained. As the oxide material and/or the nitride material included in the diffusion suppression layer, for example, an oxide material or a nitride material including an element such as Mg, Al, Si, Ti, V, Cr, Mn, Fe, Co, Ni, Cu, Zn, Zr, Nb, Mo, Ru, Rh, Pd, Ag, Hf, Ta, W, Sn, Cd, Ga, or the like is used. The diffusion suppression layer is a layer that does not contribute to the magnetoresistance effect. It is favorable for the resistance per area of the diffusion suppression layer to be low. For example, it is favorable for the resistance per area of the diffusion suppression layer to be set to be lower than the resistance per area of the intermediate layer that contributes to the magnetoresistance effect. From the perspective of reducing the resistance per area of the diffusion suppression layer, it is favorable for the diffusion suppression layer to be an oxide or a nitride of Mg, Ti, V, Zn, Sn, Cd, or Ga. The barrier height of these materials is low. It is favorable to use an oxide having a strong chemical bond to suppress the diffusion of the boron. For example, a MgO layer of 1.5 nm is used. Oxynitrides are included in one of the oxide or the nitride.

In the case where the diffusion suppression layer includes an oxide or a nitride, it is favorable for the thickness of the diffusion suppression layer to be, for example, 0.5 nm or more. Thereby, the diffusion suppression function of the boron is realized sufficiently. It is favorable for the thickness of the diffusion suppression layer to be 5 nm or less. Thereby, for example, a low resistance per area is obtained. It is favorable for the thickness of the diffusion suppression layer to be not less than 0.5 nm and not more than 5 nm; and it is favorable to be not less than 1 nm and not more than 3 nm.

At least one selected from the group consisting of magnesium (Mg), silicon (Si), and aluminum (Al) may be used as the diffusion suppression layer. A material that includes these light elements may be used as the diffusion suppression layer. These light elements produce compounds by bonding with boron. For example, at least one of a Mg—B compound, an Al—B compound, or a Si—B compound is formed at the portion including the interface between the diffusion suppression layer and the free magnetic layer 210. These compounds suppress the diffusion of boron.

Another metal layer, etc., may be inserted between the diffusion suppression layer and the free magnetic layer 210. In the case where the distance between the diffusion suppression layer and the free magnetic layer 210 is too long, boron diffuses between the diffusion suppression layer and the free magnetic layer 210; and the boron concentration in the free magnetic layer 210 undesirably decreases. Therefore, it is favorable for the distance between the diffusion suppression layer and the free magnetic layer 210 to be 10 nm or less; and it is more favorable to be 3 nm or less.

Figure 18:
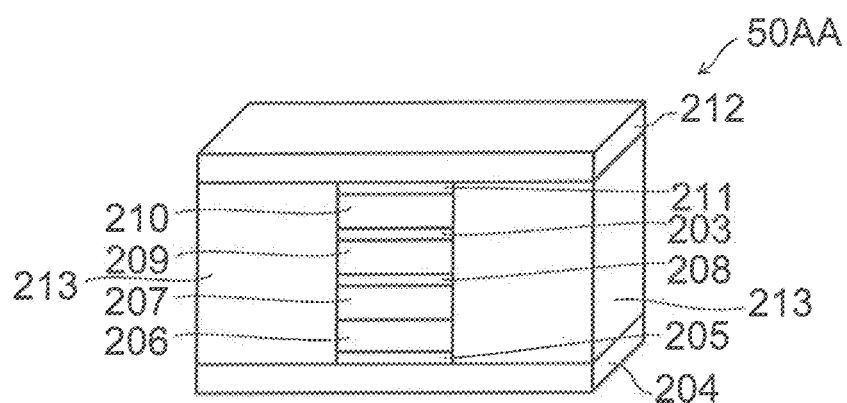
FIG. 18 is a schematic perspective view illustrating a portion of another sensor according to the embodiment.

FIG. 18 is a schematic perspective view illustrating a portion of another sensor according to the embodiment.

As shown in FIG. 18, other than an insulating layer 213 being provided, a sensor portion 50AA is similar to the sensor portion 50A. The insulating layer 213 is provided between the lower electrode 204 and the upper electrode 212. The insulating layer 213 is arranged with the free magnetic layer 210 and the first magnetization reference layer 209 in a direction crossing the direction connecting the lower electrode 204 and the upper electrode 212. The portions other than the insulating layer 213 are similar to those of the sensor portion 50A; and a description is therefore omitted.

The insulating layer 213 includes, for example, aluminum oxide (e.g., $Al_2O_3$), silicon oxide (e.g., $SiO_2$), etc. The leakage current of the sensor portion 50AA is suppressed by the insulating layer 213. The insulating layer 213 may be provided in the sensor portions described below.

Figure 19:
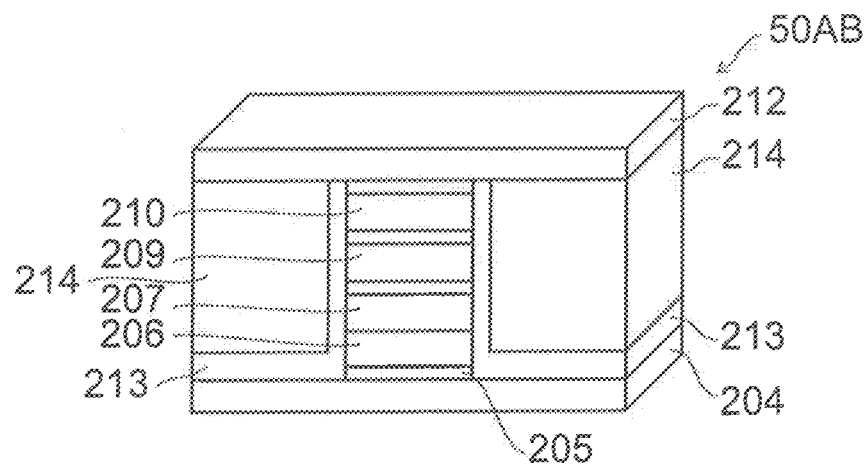
FIG. 19 is a schematic perspective view illustrating a portion of another sensor according to the embodiment.

FIG. 19 is a schematic perspective view illustrating a portion of another sensor according to the embodiment.

As shown in FIG. 19, a hard bias layer 214 is further provided in a sensor portion 50AB. Otherwise, the sensor portion 50AB is similar to the sensor portion 50A. The hard bias layer 214 is provided between the lower electrode 204 and the upper electrode 212. The free magnetic layer 210 and the first magnetization reference layer 209 are arranged between two portions of the hard bias layer 214 in a direction crossing the direction connecting the lower electrode 204 and the upper electrode 212. Otherwise, the sensor portion 50AB is similar to the sensor portion 50AA.

The hard bias layer 214 sets the magnetization direction of the free magnetic layer 210 by the magnetization of the hard bias layer 214. The magnetization direction of the free magnetic layer 210 is set to the desired direction by the hard bias layer 214 in a state in which pressure from the outside is not applied to the film.

The hard bias layer 214 includes, for example, Co—Pt, Fe—Pt, Co—Pd, Fe—Pd, etc. For example, the magnetic anisotropy and the coercivity are relatively high for these materials. These materials are, for example, hard magnetic materials. The hard bias layer 214 may include, for example, an alloy in which an added element is further added to Co—Pt, Fe—Pt, Co—Pd, or Fe—Pd. The hard bias layer 214 may include, for example, CoPt (the proportion of Co being not less than 50 at. % and not more than 85 at. %), $(Co_xPt_{100-x})_{100-y}Cr_y$ (x being not less than 50 at. % and not more than 85 at. %, and y being not less than 0 at. % and not more than 40 at. %), FePt (the proportion of Pt being not less than 40 at. % and not more than 60 at. %), etc. In the case where such a material is used, by applying an external magnetic field that is larger than the coercivity of the hard bias layer 214, the direction of the magnetization of the hard bias layer 214 is set (fixed) in the direction in which the external magnetic field is applied. The thickness of the hard bias layer 214 (e.g., the length along the direction from the lower electrode 204 toward the upper electrode) is, for example, not less than 5 nm and not more than 50 nm.

In the case where the insulating layer 213 is disposed between the lower electrode 204 and the upper electrode 212, $SiO_x$ or $AlO_x$ is used as the material of the insulating layer 213. A not-illustrated foundation layer may be provided between the insulating layer 213 and the hard bias layer 214. Cr, Fe—Co, or the like is used as the material of the foundation layer for the hard bias layer 214 in the case where the hard bias layer 214 includes a hard magnetic material such as Co—Pt, Fe—Pt, Co—Pd, Fe—Pd, etc.

The hard bias layer 214 may have a structure of being stacked with a not-illustrated pinning layer for the hard bias layer. In such a case, the direction of the magnetization of the hard bias layer 214 can be set (fixed) by the exchange coupling of the hard bias layer 214 and the pinning layer for the hard bias layer. In such a case, the hard bias layer 214 includes a ferromagnetic material of at least one of Fe, Co, or NI or an alloy including at least one type of these elements. In such a case, the hard bias layer 214 includes, for example, a $Co_xFe_{100-x}$ alloy (x being not less than 0 at. % and not more than 100 at. %), a $Ni_xFe_{100-x}$ alloy (x being not less than 0 at. % and not more than 100 at. %), or a material in which a nonmagnetic element is added to these alloys. A material that is similar to the first magnetization reference layer 209 described above is used as the hard bias layer 214. The pinning layer for the hard bias layer includes a material similar to the pinning layer 206 inside the sensor portion 50A described above. In the case where the pinning layer for the hard bias layer is provided, a foundation layer similar to the material included in the foundation layer 205 may be provided under the pinning layer for the hard bias layer. The pinning layer for the hard bias layer may be provided at a lower portion or at an upper portion of the hard bias layer. In such a case, the magnetization direction of the hard bias layer 214 is determined by heat treatment in a magnetic field similarly to the pinning layer 206.

The hard bias layer 214 and the insulating layer 213 described above are applicable also to any sensor portion according to the embodiment. By using the stacked structure of the hard bias layer 214 and the pinning layer for the hard bias layer, the orientation of the magnetization of the hard bias layer 214 can be maintained easily even when a large external magnetic field is applied to the hard bias layer 214 for a short period of time.

Figure 20:
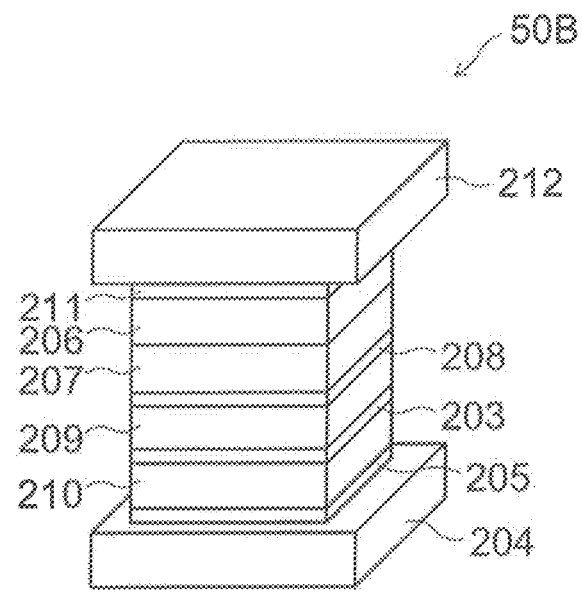
FIG. 20 is a schematic perspective view illustrating a portion of another sensor according to the embodiment.

FIG. 20 is a schematic perspective view illustrating a portion of another sensor according to the embodiment.

In a sensor portion 50B as shown in FIG. 20, the lower electrode 204, the foundation layer 205, the free magnetic layer 210, the intermediate layer 203, the first magnetization reference layer 209, the magnetic coupling layer 208, the second magnetization reference layer 207, the pinning layer 206, the capping layer 211, and the upper electrode 212 are stacked in order. The sensor portion 50B is, for example, a top spin-valve type.

The foundation layer 205 includes, for example, a stacked film of tantalum and copper (Ta/Cu). The thickness (the length in the Z-axis direction) of the Ta layer is, for example, 3 nm. The thickness of the Cu layer is, for example, 5 nm. The free magnetic layer 210 includes, for example, $Co_{40}Fe_{40}B_{20}$ having a thickness of 4 nm. The intermediate layer 203 includes, for example, a MgO layer having a thickness of 1.6 nm. The first magnetization reference layer 209 includes, for example, $Co_{40}Fe_{40}B_{20}/Fe_{50}Co_{50}$. The thickness of the $Co_{40}Fe_{40}B_{20}$ layer is, for example, 2 nm. The thickness of the $Fe_{50}Co_{50}$ layer is, for example, 1 nm. The magnetic coupling layer 208 includes, for example, a Ru layer having a thickness of 0.9 nm. The second magnetization reference layer 207 includes, for example, a $Co_{75}Fe_{25}$ layer having a thickness of 2.5 nm. The pinning layer 206 includes, for example, an IrMn-layer having a thickness of 7 nm. The capping layer 211 includes, for example, Ta/Ru. The thickness of the Ta layer is, for example, 1 nm. The thickness of the Ru layer is, for example, 5 nm.

The materials of the layers included in the sensor portion 508 may be the vertically-inverted materials of the layers included in the sensor portion 50A. The diffusion suppression layer described above may be provided between the foundation layer 205 and the free magnetic layer 210 of the sensor portion SOB.

Figure 21:
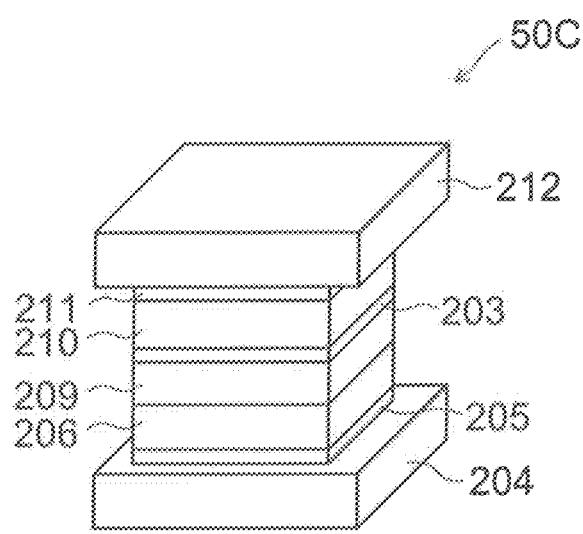
FIG. 21 is a schematic perspective view illustrating a portion of another sensor according to the embodiment.

FIG. 21 is a schematic perspective view illustrating a portion of another sensor according to the embodiment.

In a sensor portion 50C as shown in FIG. 21, the lower electrode 204, the foundation layer 205, the pinning layer 206, the first magnetization reference layer 209, the intermediate layer 203, the free magnetic layer 210, the capping layer 211, and the upper electrode 212 are stacked in this order. For example, the sensor portion 50C has a single pinned structure that uses a single magnetization reference layer.

The foundation layer 205 includes, for example, Ta/Ru. The thickness (the length in the Z-axis direction) of the Ta layer is, for example, 3 nm. The thickness of the Ru layer is, for example, 2 nm. The pinning layer 206 includes, for example, an IrMn-layer having a thickness of 7 nm. The first magnetization reference layer 209 includes, for example, a $Co_{40}Fe_{40}B_{20}$ layer having a thickness of 3 nm. The intermediate layer 203 includes, for example, a MgO layer having a thickness of 1.6 nm. The free magnetic layer 210 includes, for example, $Co_{40}Fe_{40}B_{20}$ having a thickness of 4 nm. The capping layer 211 includes, for example, Ta/Ru. The thickness of the Ta layer is, for example, 1 nm. The thickness of the Ru layer is, for example, 5 nm.

For example, materials similar to the materials of the layers of the sensor portion 50A are used as the materials of the layers of the sensor portion 50C.

Figure 22:
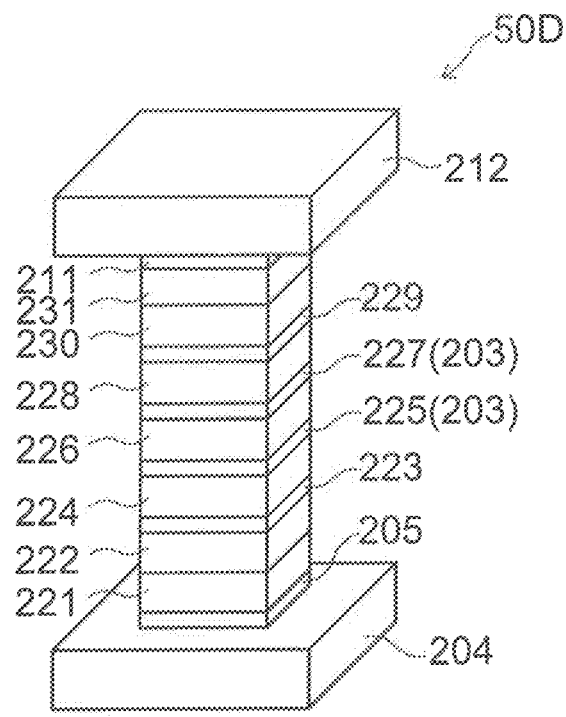
FIG. 22 is a schematic perspective view illustrating a portion of another sensor according to the embodiment.

FIG. 22 is a schematic perspective view illustrating a portion of another sensor according to the embodiment.

In a sensor portion 50D as shown in FIG. 22, the lower electrode 204, the foundation layer 205, a lower pinning layer 221, a lower second magnetization reference layer 222, a lower magnetic coupling layer 223, a lower first magnetization reference layer 224, a lower intermediate layer 225, a free magnetic layer 226, an upper intermediate layer 227, an upper first magnetization reference layer 228, an upper magnetic coupling layer 229, an upper second magnetization reference layer 230, an upper pinning layer 231, the capping layer 211, and the upper electrode 212 are stacked in order.

The foundation layer 205 includes, for example, Ta/Ru. The thickness (the length in the Z-axis direction) of the Ta layer is, for example, 3 nanometers (nm). The thickness of the Ru layer is, for example, 2 nm. The lower pinning layer 221 includes, for example, an IrMn-layer having a thickness of 7 nm. The lower second magnetization reference layer 222 includes, for example, a $Co_{75}Fe_{25}$ layer having a thickness of 2.5 nm. The lower magnetic coupling layer 223 includes, for example, a Ru layer having a thickness of 0.9 nm. The lower first magnetization reference layer 224 includes, for example, a $Co_{40}Fe_{40}B_{20}$ layer having a thickness of 3 nm. The lower intermediate layer 225 includes, for example, a MgO layer having a thickness of 1.6 nm. The free magnetic layer 226 includes, for example, $Co_{40}Fe_{40}B_{20}$ having a thickness of 4 nm. The upper intermediate layer 227 includes, for example, a MgO layer having a thickness of 1.6 nm. The upper first magnetization reference layer 228 includes, for example, $Co_{40}Fe_{40}B_{20}/Fe_{50}Co_{50}$. The thickness of the $Co_{40}Fe_{40}B_{20}$ layer is, for example, 2 nm. The thickness of the $Fe_{50}Co_{50}$ layer is, for example, 1 nm. The upper magnetic coupling layer 229 includes, for example, a Ru layer having a thickness of 0.9 nm. The upper second magnetization reference layer 230 includes, for example, a $Co_{75}Fe_{25}$ layer having a thickness of 2.5 nm. The upper pinning layer 231 includes, for example, an IrMn-layer having a thickness of 7 nm. The capping layer 211 includes, for example, Ta/Ru. The thickness of the Ta layer is, for example, 1 nm. The thickness of the Ru layer is, for example, 5 nm.

For example, materials similar to the materials of the layers of the sensor portion 50A are used as the materials of the layers of the sensor portion 50D.

Figure 23:
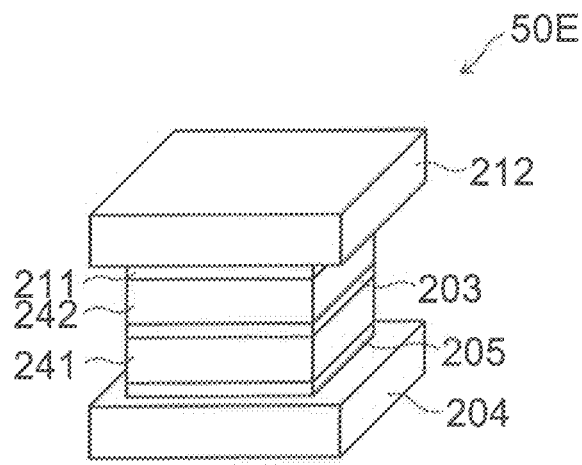
FIG. 23 is a schematic perspective view illustrating a portion of another sensor according to the embodiment.

FIG. 23 is a schematic perspective view illustrating a portion of another sensor according to the embodiment.

In a sensor portion 50E as shown in FIG. 23, the lower electrode 204, the foundation layer 205, a first free magnetic layer 241, the intermediate layer 203, a second free magnetic layer 242, the capping layer 211, and the upper electrode 212 are stacked in this order.

The foundation layer 205 includes, for example, Ta/Cu. The thickness (the length in the Z-axis direction) of the Ta layer is, for example, 3 nm. The thickness of the Cu layer is, for example, 5 nm. The first free magnetic layer 241 includes, for example, $Co_{20}Fe_{40}B_{20}$ having a thickness of 4 nm. The intermediate layer 203 includes, for example, $Co_{40}Fe_{40}B_{20}$ having a thickness of 4 nm. The capping layer 211 includes, for example, Cu/Ta/Ru. The thickness of the Cu layer is, for example, 5 nm. The thickness of the Ta layer is, for example, 1 nm. The thickness of the Ru layer is, for example, 5 nm.

Materials similar to the materials of the layers of the sensor portion 50A are used as the materials of the layers of the sensor portion 50E. For example, materials similar to those of the free magnetic layer 210 of the sensor portion 50A may be used as the materials of the first free magnetic layer 241 and the second free magnetic layer 242.

Fifth Embodiment

The embodiment relates to an electronic device. The electronic device includes, for example, a sensor according to the embodiments recited above or a sensor of a modification of the embodiments. The electronic device includes, for example, an information terminal. The information terminal includes a recorder, etc. The electronic device includes a microphone, a blood pressure sensor, a touch panel, etc.

Figure 24:
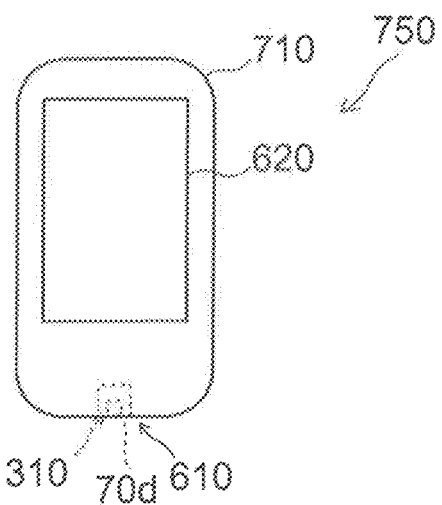
FIG. 24 is a schematic view illustrating the electronic device according to the fifth embodiment.

FIG. 24 is a schematic view illustrating the electronic device according to the fifth embodiment.

As shown in FIG. 24, an electronic device 750 according to the embodiment is, for example, an information terminal 710. For example, a microphone 610 is provided in the information terminal 710.

The microphone 610 includes, for example, a sensor 310. For example, the film portion 71 is substantially parallel to the surface of the information terminal 710 where a display unit 620 is provided. The arrangement of the film portion 71 is arbitrary. Any sensor described in reference to the first to third embodiments is applicable to the sensor 310.

Figure 25A:
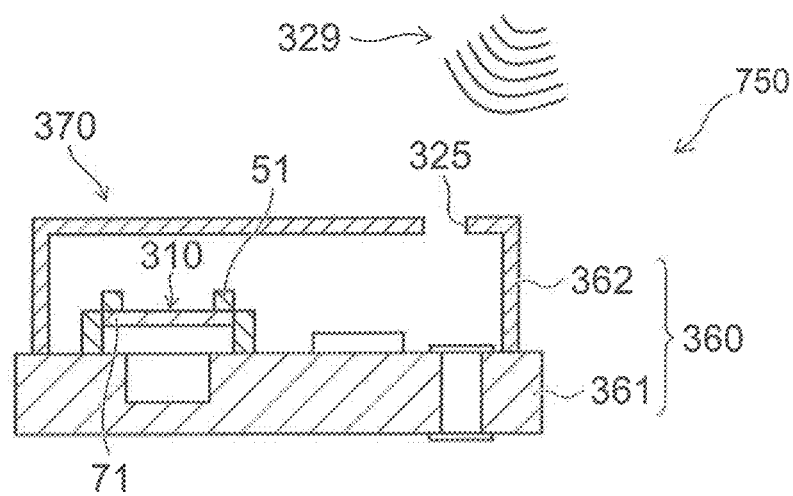
FIG. 25A and FIG. 25B are schematic cross-sectional views illustrating the electronic device according to the fifth embodiment.
Figure 25B:
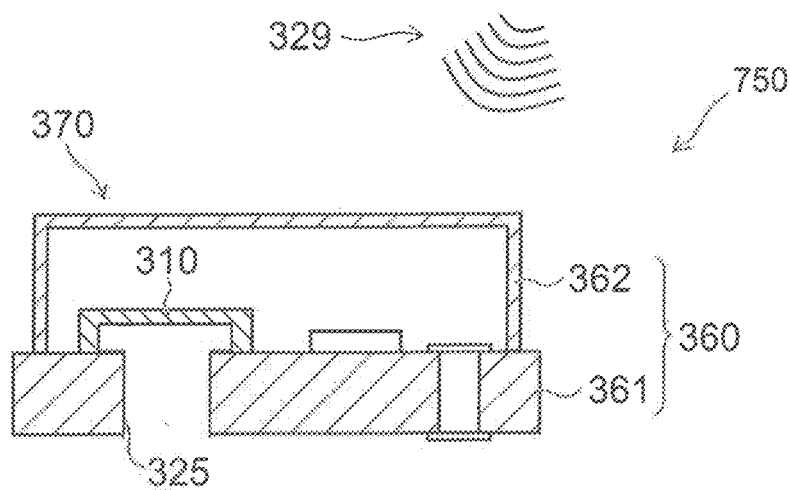

FIG. 25A and FIG. 25B are schematic cross-sectional views illustrating the electronic device according to the fifth embodiment.

As shown in FIG. 25A and FIG. 25B, the electronic device 750 (e.g., a microphone 370 (an acoustic microphone)) includes a housing 360, a cover 362, and the sensor 310. The housing 360 includes, for example, a substrate 361 (e.g., the printed circuit board) and the cover 362. The substrate 361 includes, for example, a circuit such as an amplifier, etc.

An acoustic hole 325 is provided in the housing 360 (at least one of the substrate 361 or the cover 362). In the example shown in FIG. 25B, the acoustic hole 325 is provided in the cover 362. In the example shown in FIG. 25B, the acoustic hole 325 is provided in the substrate 361. Sound 329 passes through the acoustic hole 325 and enters the interior of the cover 362. The microphone 370 responds to the sound pressure.

For example, the sensor 310 is disposed on the substrate 361; and electrical signal lines (not illustrated) are provided. The cover 362 is provided to cover the sensor 310. The housing 360 is provided around the sensor 310. For example, the first sensor portion 51 and the film portion 71 are disposed between the substrate 361 and the cover 362. For example, the sensor 310 is disposed between the substrate 361 and the cover 362.

FIG. 26A and FIG. 26B are schematic views illustrating another electronic device according to the fifth embodiment.

In the example of these drawings, the electronic device 750 is a blood pressure sensor 330. FIG. 26A is a schematic plan view illustrating skin on an arterial vessel of a human. FIG. 26B is a line H1-H2 cross-sectional view of FIG. 26A.

The sensor 310 is used as a sensor in the blood pressure sensor 330. The sensor 310 contacts the skin 333 on the arterial vessel 331. Thereby, the blood pressure sensor 330 can continuously perform blood pressure measurements.

FIG. 27 is a schematic view illustrating another electronic device according to the fifth embodiment.

In the example of the drawing, the electronic device 750 is a touch panel 340. In the touch panel 340, the sensors 310 are provided in at least one of the interior of the display or the exterior of the display.

For example, the touch panel 340 includes multiple first leads 346, multiple second leads 347, the multiple sensors 310, and a control circuit 341.

In the example, the multiple first leads 346 are arranged along the Y-axis direction. Each of the multiple first leads 346 extends along the X-axis direction. The multiple second leads 347 are arranged along the X-axis direction. Each of the multiple second leads 347 extends along the Y-axis direction.

The multiple sensors 310 are provided respectively at the crossing portions between the multiple first leads 346 and the multiple second leads 347. One sensor 310 is used as one sensing component Es for sensing. The crossing portion includes the position where the first lead 346 and the second lead 347 cross and includes the region at the periphery of the position.

One end E1 of each of the multiple sensors 310 is connected to one of the multiple first leads 346. One other end E2 of each of the multiple sensors 310 is connected to one of the multiple second leads 347.

The control circuit 341 is connected to the multiple first leads 346 and the multiple second leads 347. For example, the control circuit 341 includes a first interconnect circuit 346d that is connected to the multiple first leads 346, a second interconnect circuit 347d that is connected to the multiple second leads 347, and a control signal circuit 345 that is connected to the first interconnect circuit 346d and the second interconnect circuit 347d.

According to the fifth embodiment, an electronic device that uses a sensor in which the sensitivity can be increased can be provided.

The embodiments include, for example, the following configurations.
(Configuration 1)
A sensor, comprising:
 a film portion, the film portion being deformable;
 a first sensor portion provided at the film portion, the first sensor portion including
  a first conductive layer,
  a second conductive layer provided between the first conductive layer and the film portion,
  a first magnetic layer provided between the first conductive layer and the second conductive layer,
  a second magnetic layer provided between the first magnetic layer and the second conductive layer, and
  a first intermediate layer provided between the first magnetic layer and the second magnetic layer,
 a curvature of the first conductive layer being different from a curvature of at least a portion of the film portion.
(Configuration 2)
The sensor according to configuration 1, wherein
 the first conductive layer has a first conductive layer surface, and a second conductive layer surface positioned between the first conductive layer surface and the film portion, and
 the first conductive layer surface is curved.

(Configuration 3)

The sensor according to configuration 2, further comprising a support portion supporting the film portion, the first conductive layer surface including a first point, a second point, and a third point, the third point being positioned between the first point and the second point on the first conductive layer surface, the first to third points being positioned in a plane including a first direction and a second direction, the first direction being on a shortest line connecting the support portion and the first sensor portion, the second direction being from the second magnetic layer toward the first magnetic layer, a first straight line connecting the first point and the third point being tilted with respect to a second straight line connecting the second point and the third point.

(Configuration 4)

The sensor according to configuration 3, wherein a magnetostriction constant of the first magnetic layer is positive, a direction of a magnetization of the second magnetic layer is aligned with a third direction, the third direction is perpendicular to the first direction and perpendicular to the second direction, and a straight line connecting the first point and the second point is positioned between the third point and the film portion.

(Configuration 5)

The sensor according to configuration 3, wherein a magnetostriction constant of the first magnetic layer is negative, a direction of a magnetization of the second magnetic layer is aligned with the third direction, the third direction is perpendicular to the first direction and perpendicular to the second direction, and the third point is positioned between the film portion and a straight line connecting the first point and the second point.

(Configuration 6)

The sensor according to configuration 3, wherein a magnetostriction constant of the first magnetic layer is negative, a direction of a magnetization of the second magnetic layer is aligned with the first direction, and a straight line connecting the first point and the second point is positioned between the third point and the film portion.

(Configuration 7)

The sensor according to configuration 3, wherein a magnetostriction constant of the first magnetic layer is positive, a direction of a magnetization of the second magnetic layer is aligned with the first direction, and the third point is positioned between the film portion and a straight line connecting the first point and the second point.

(Configuration 8)

The sensor according to one of configurations 2 to 7, wherein a curvature of the first conductive layer surface is not less than 0.1 (mm$^{-1}$) and not more than 2.0 (mm$^{-1}$).

(Configuration 9)

The sensor according to configuration 8, wherein the first magnetic layer includes at least one selected from a group consisting of iron, cobalt and nickel, and boron.

(Configuration 10)

The sensor according to one of configurations 1 to 9, wherein the film portion is positioned between a first space and a second space, and the first conductive layer is curved in a first state in which an air pressure of the first space is substantially the same as an air pressure of the second space.

(Configuration 11)

The sensor according to one of configurations 1 to 10, wherein the curvature of the first conductive layer is higher than the curvature of the at least a portion of the film portion.

(Configuration 12)

A sensor, comprising:

a film portion, the film portion being deformable; and a first sensor portion provided at the film portion, the first sensor portion including a first magnetic layer, a second magnetic layer provided between the first magnetic layer and the film portion, and a first intermediate layer provided between the first magnetic layer and the second magnetic layer, a curvature of the first magnetic layer being different from the curvature of at least a portion of the film portion.

(Configuration 13)

The sensor according to configuration 12, wherein the first magnetic layer has a first magnetic layer surface, and a second magnetic layer surface positioned between the first magnetic layer surface and the film portion, and the first magnetic layer surface is curved.

(Configuration 14)

The sensor according to configuration 13, further comprising a support portion supporting the film portion, the first magnetic layer surface including a first point, a second point, and a third point, the third point being positioned between the first point and the second point on the first magnetic layer surface, the first to third points being positioned in a plane including a first direction and a second direction, the first direction being on a shortest line connecting the support portion and the first sensor portion, the second direction being from the second magnetic layer toward the first magnetic layer, a first straight line connecting the first point and the third point being tilted with respect to a second straight line connecting the second point and the third point.

(Configuration 15)

The sensor according to configuration 13 or 14, wherein a curvature of the first magnetic layer surface is not less than 0.1 (mm$^{-1}$) and not more than 2.0 (mm$^{-1}$).

(Configuration 16)

The sensor according to configuration 15, wherein the first magnetic layer includes at least one selected from a group consisting of iron, cobalt and nickel, and boron.

(Configuration 17)

The sensor according to one of configurations 12 to 16, wherein the film portion is positioned between a first space and a second space, and the first magnetic layer is curved in a first state in which an air pressure of the first space is substantially the same as an air pressure of the second space.

(Configuration 18)

The sensor according to one of configurations 12 to 17, wherein the curvature of the first magnetic layer is higher than the curvature of the at least a portion of the film portion.

(Configuration 19)

A sensor, comprising:

a film portion, the film portion being deformable;

an insulating film; and a first sensor portion provided at the film portion, the first sensor portion including
    a first magnetic layer provided between the insulating film and the film portion,
    a second magnetic layer provided between the first magnetic layer and the film portion, and
    a first intermediate layer provided between the first magnetic layer and the second magnetic layer,
a curvature of the insulating film being different from a curvature of at least a portion of the film portion.
(Configuration 20)
The sensor according to configuration 19, wherein
the insulating film has a first insulating film surface, and a second insulating film surface positioned between the first insulating film surface and the film portion, and
the first insulating film surface is curved.
(Configuration 21)
The sensor according to configuration 20, further comprising a support portion supporting the film portion,
the first insulating film surface including a first point, a second point, and a third point, the third point being positioned between the first point and the second point on the first insulating film surface,
the first to third points being positioned in a plane including a first direction and a second direction, the first direction being on a shortest line connecting the support portion and the first sensor portion, the second direction being from the second magnetic layer toward the first magnetic layer,
a first straight line connecting the first point and the third point being tilted with respect to a second straight line connecting the second point and the third point.
(Configuration 22)
The sensor according to configuration 20 or 21, wherein a curvature of the first magnetic layer surface is not less than 0.1 (mm$^{-1}$) and not more than 2.0 (mm$^{-1}$).
(Configuration 23)
The sensor according to one of configurations 19 to 22, wherein
the film portion is positioned between a first space and a second space, and
the insulating film is curved in a first state in which an air pressure of the first space is substantially the same as an air pressure of the second space.
(Configuration 24)
The sensor according to one of configurations 19 to 23, wherein
the curvature of the insulating film is higher than the curvature of the at least a portion of the film portion.
(Configuration 25)
The sensor according to one of configurations 1 to 24, wherein the at least a portion of the film portion includes a center of the film portion.
(Configuration 26)
The sensor according to configuration 25, wherein the at least a portion of the film portion is a region along a fourth direction connecting the first sensor portion and the center of the film portion.
(Configuration 27)
The sensor according to configuration 26, wherein a length along the fourth direction of the at least a portion of the film portion is not less than 0.5 times a length along the fourth direction of the film portion.
(Configuration 28)
The sensor according to one of configurations 1 to 27, further comprising:
    a substrate; and
    a cover,
    the first sensor portion and the film portion being disposed between the substrate and the cover.
(Configuration 29)
An electronic device, comprising:
    the sensor according to one of configurations 1 to 27; and
    a housing.

The "sensor" may be a "sensor device", for example. A configuration including the "sensor device" and the controller can be regarded as "sensor". The "sensor" may include at least one of substrate and cover.

According to the embodiments, a sensor and an electronic device can be provided in which the sensitivity can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components such as the film portion, the sensor portion, the support portion, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the invention also are within the scope of the invention to the extent that the spirit of the invention is included.

What is claimed is:
1. A sensor, comprising:
    a film portion, the film portion being deformable;
    a support portion supporting the film portion; and
    a first sensor portion provided at the film portion, the first sensor portion including
        a first conductive layer,
        a second conductive layer provided between the first conductive layer and the film portion,
        a first magnetic layer provided between the first conductive layer and the second conductive layer,
        a second magnetic layer provided between the first magnetic layer and the second conductive layer, and
        a first intermediate layer provided between the first magnetic layer and the second magnetic layer,
    a curvature of the first conductive layer being different from a curvature of at least a portion of the film portion, wherein
    the first conductive layer has a first conductive layer surface, and a second conductive layer surface positioned between the first conductive layer surface and the film portion, and
    the first conductive layer surface including a first point, a second point, and a third point, the third point being positioned between the first point and the second point on the first conductive layer surface,
    the first to third points being positioned in a plane including a first direction and a second direction, the first direction being on a shortest line connecting the support portion and the first sensor portion, the second direction being from the second magnetic layer toward the first magnetic layer, a first straight line connecting the first point and the third point being tilted with respect to a second straight line connecting the second point and the third point.

2. The sensor according to claim 1, wherein a magnetostriction constant of the first magnetic layer is positive, a direction of a magnetization of the second magnetic layer is aligned with a third direction, the third direction is perpendicular to the first direction and perpendicular to the second direction, and a straight line connecting the first point and the second point is positioned between the third point and the film portion.

3. The sensor according to claim 1, wherein a magnetostriction constant of the first magnetic layer is negative, a direction of a magnetization of the second magnetic layer is aligned with the third direction, the third direction is perpendicular to the first direction and perpendicular to the second direction, and the third point is positioned between the film portion and a straight line connecting the first point and the second point.

4. The sensor according to claim 1, wherein a magnetostriction constant of the first magnetic layer is negative, a direction of a magnetization of the second magnetic layer is aligned with the first direction, and a straight line connecting the first point and the second point is positioned between the third point and the film portion.

5. The sensor according to claim 1, wherein the at least a portion of the film portion includes a center of the film portion.

6. The sensor according to claim 1, further comprising:
a printed circuit board; and
a cover,
the first sensor portion and the film portion being disposed between the printed circuit board and the cover.

7. A sensor, comprising:
a film portion, the film portion being deformable; and
a first sensor portion provided at the film portion, the first sensor portion including
a first magnetic layer,
a second magnetic layer provided between the first magnetic layer and the film portion, and
a first intermediate layer provided between the first magnetic layer and the second magnetic layer,
a curvature of the first magnetic layer being different from a curvature of at least a portion of the film portion,
wherein
the film portion is positioned between a first space and a second space, and
the first magnetic layer is curved in a first state in which an air pressure of the first space is substantially the same as an air pressure of the second space.

8. The sensor according to claim 7, wherein the curvature of the first magnetic layer is higher than the curvature of the at least a portion of the film portion.

9. A sensor, comprising:
a film portion, the film portion being deformable;
an insulating film; and
a first sensor portion provided at the film portion, the first sensor portion including
a first magnetic layer provided between the insulating film and the film portion,
a second magnetic layer provided between the first magnetic layer and the film portion, and
a first intermediate layer provided between the first magnetic layer and the second magnetic layer,
a curvature of the insulating film being different from a curvature of at least a portion of the film portion,
wherein
the film portion is positioned between a first space and a second space, and
the insulating film is curved in a first state in which an air pressure of the first space is substantially the same as an air pressure of the second space.

10. The sensor according to claim 9, wherein
the curvature of the insulating film is higher than the curvature of the at least a portion of the film portion.

11. An electronic device, comprising:
the sensor according to claim 1; and
a housing.

* * * * *